Figure 1:
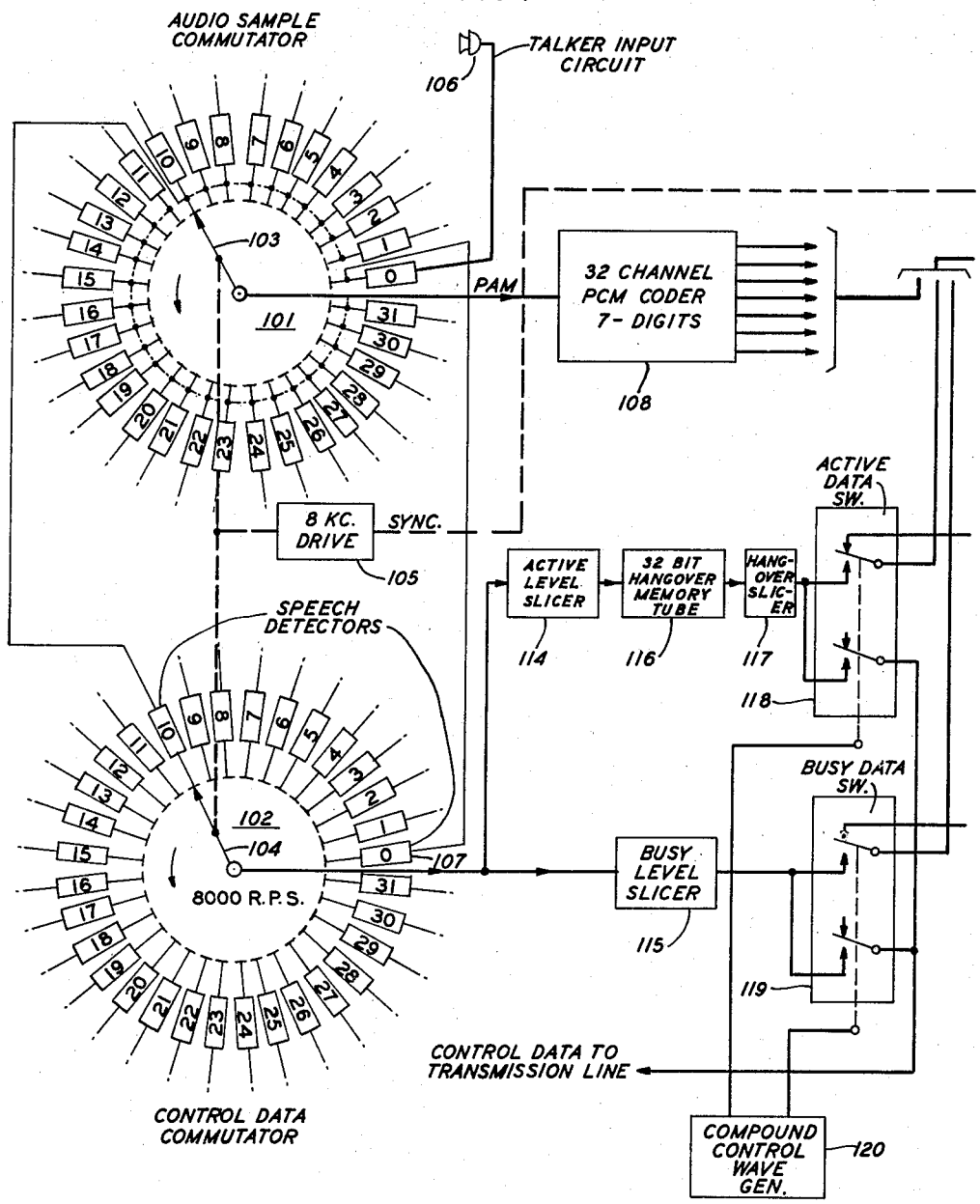

| TRANSMITTER | | |
|---|---|---|
| FIG. 1 | FIG. 2 | FIG. 3 |

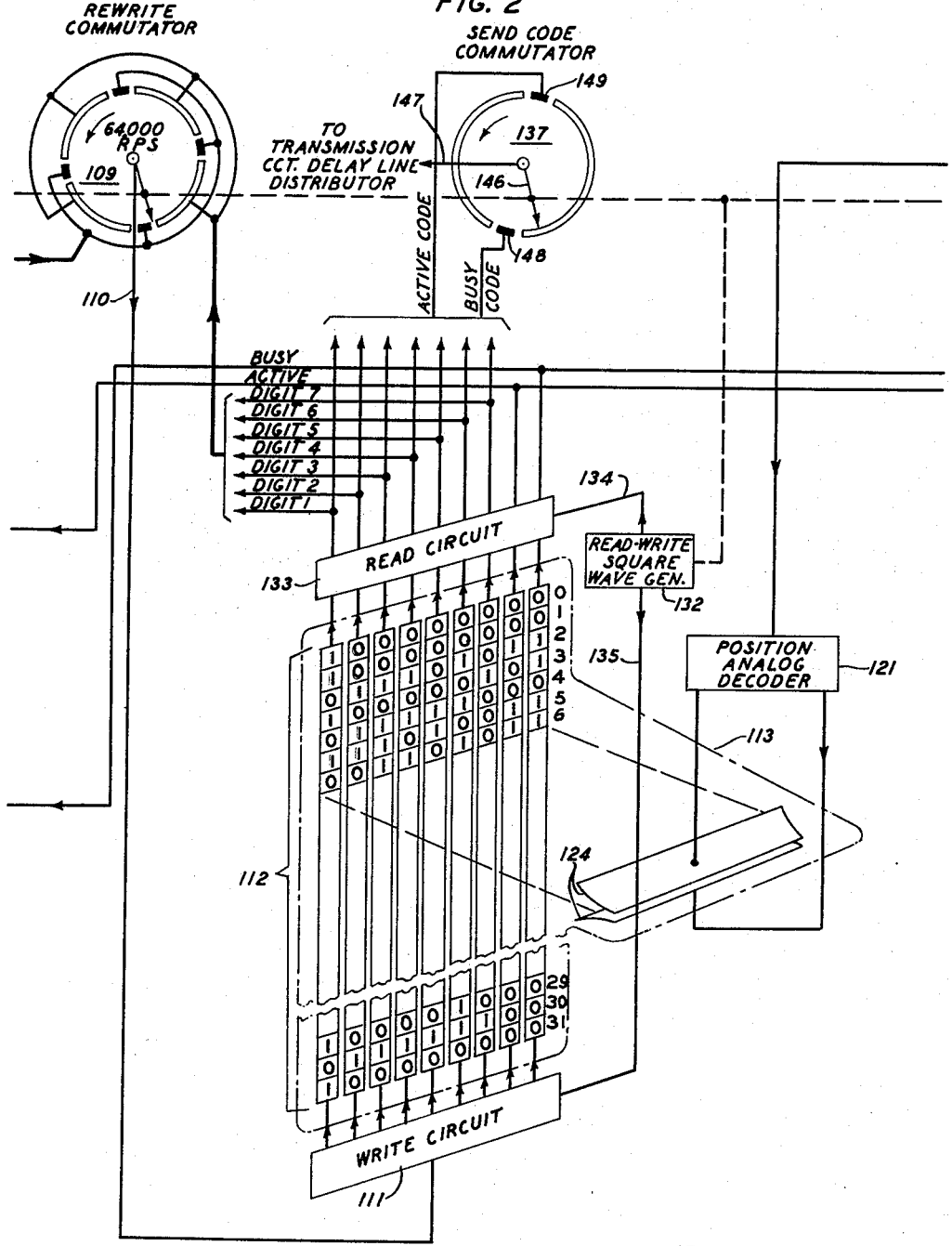

Nov. 22, 1960     R. L. CARBREY ET AL     2,961,492
ELASTIC MULTIPLEX SPEECH INTERPOLATION SYSTEM
Filed Sept. 26, 1957     16 Sheets-Sheet 3

INVENTORS: R. L. CARBREY
C. B. H. FELDMAN
BY *Harry C. Hart*
ATTORNEY

Nov. 22, 1960  R. L. CARBREY ET AL  2,961,492
ELASTIC MULTIPLEX SPEECH INTERPOLATION SYSTEM
Filed Sept. 26, 1957  16 Sheets-Sheet 4

| RECEIVER | | |
|---|---|---|
| FIG. 5 | FIG. 6 | FIG. 7 |

INVENTORS: R. L. CARBREY
C. B. H. FELDMAN
BY Harry C. Hart
ATTORNEY

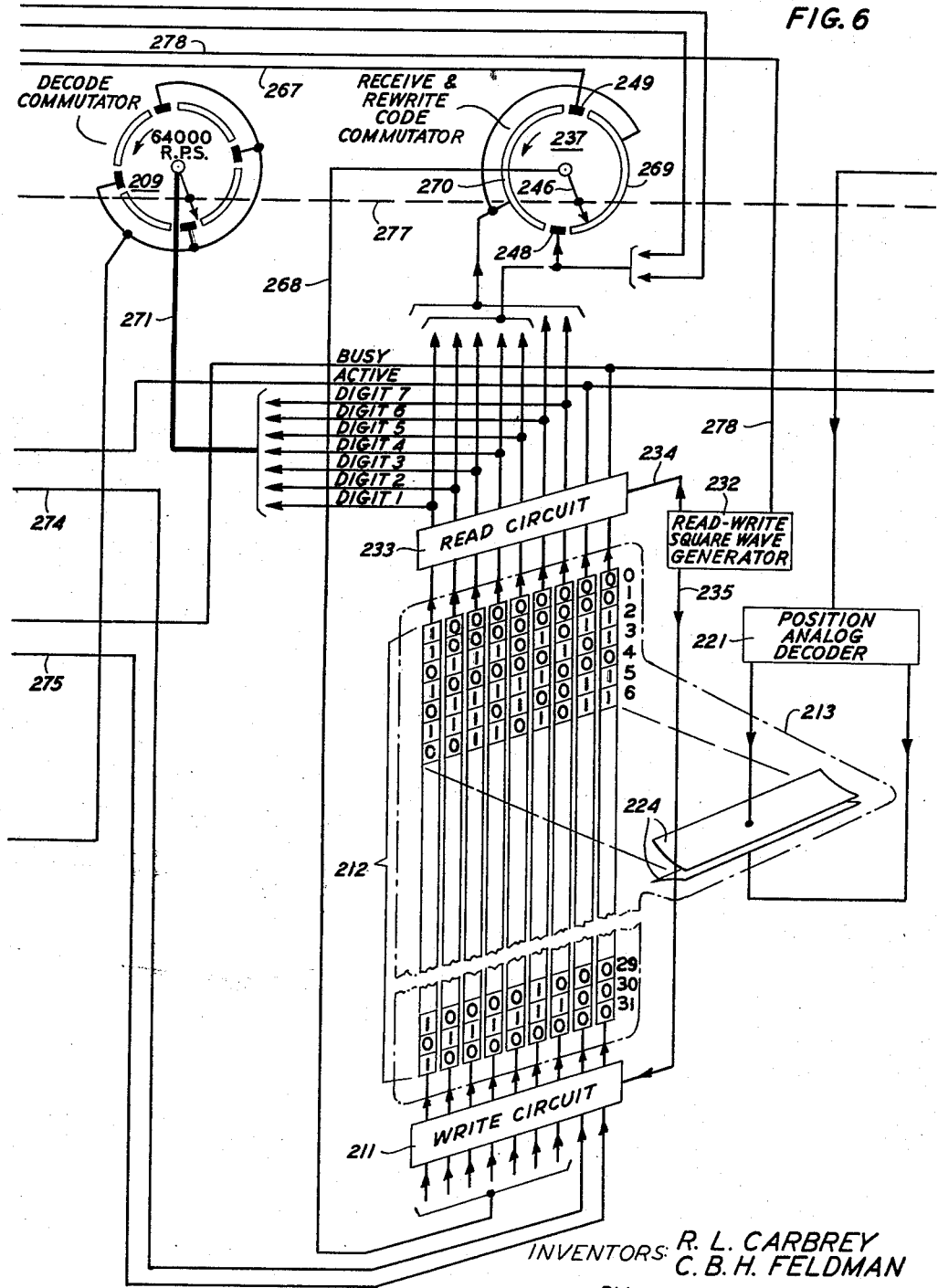

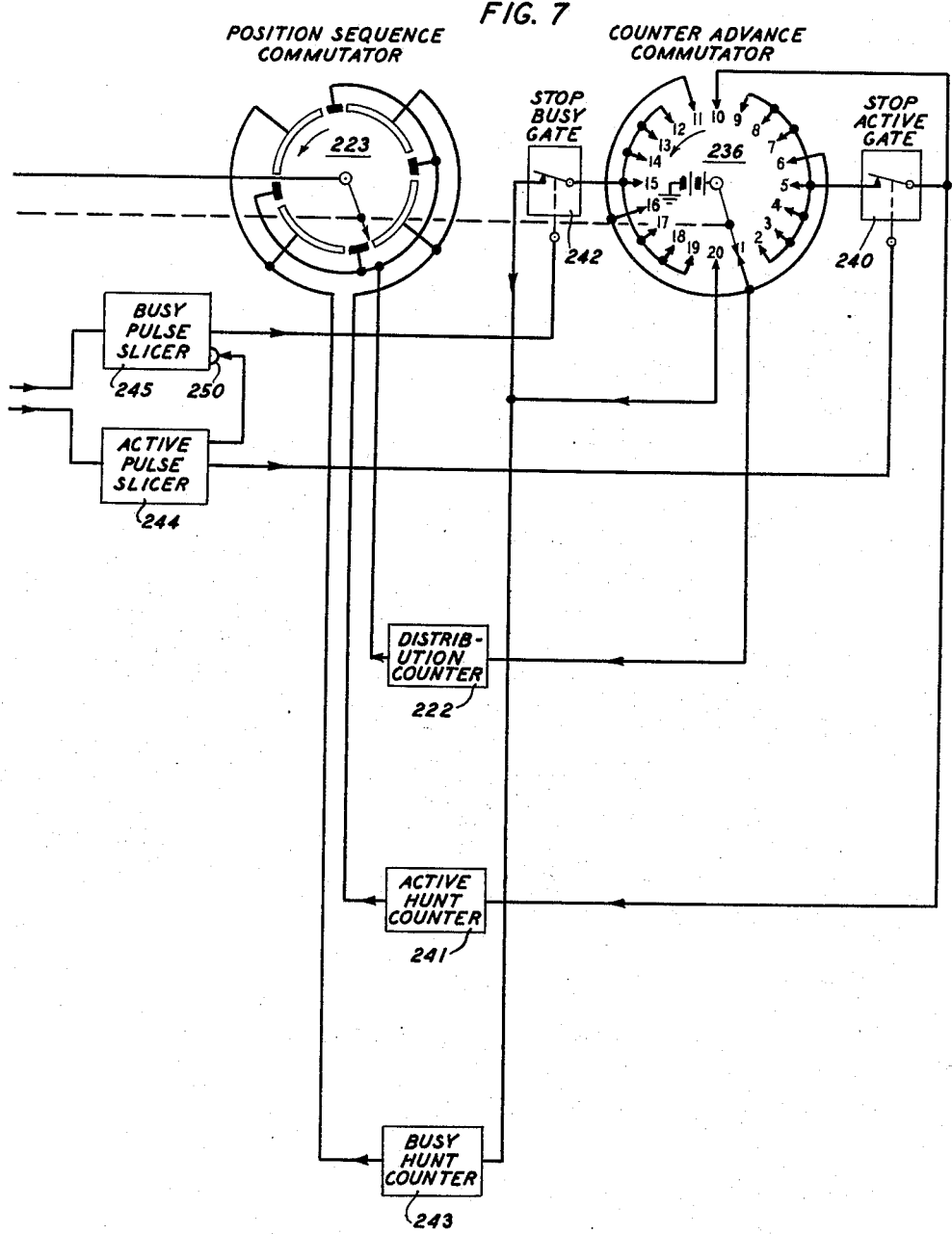

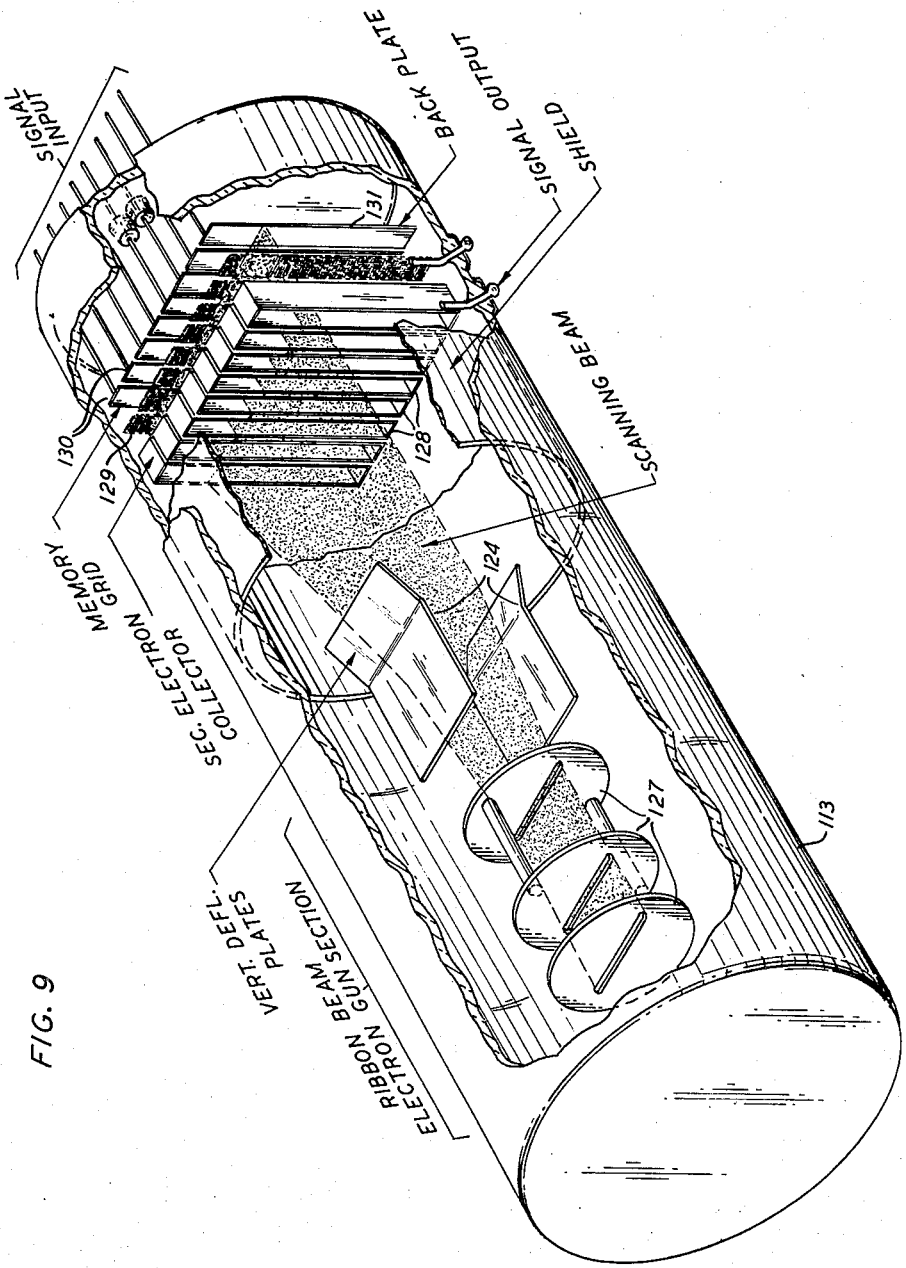

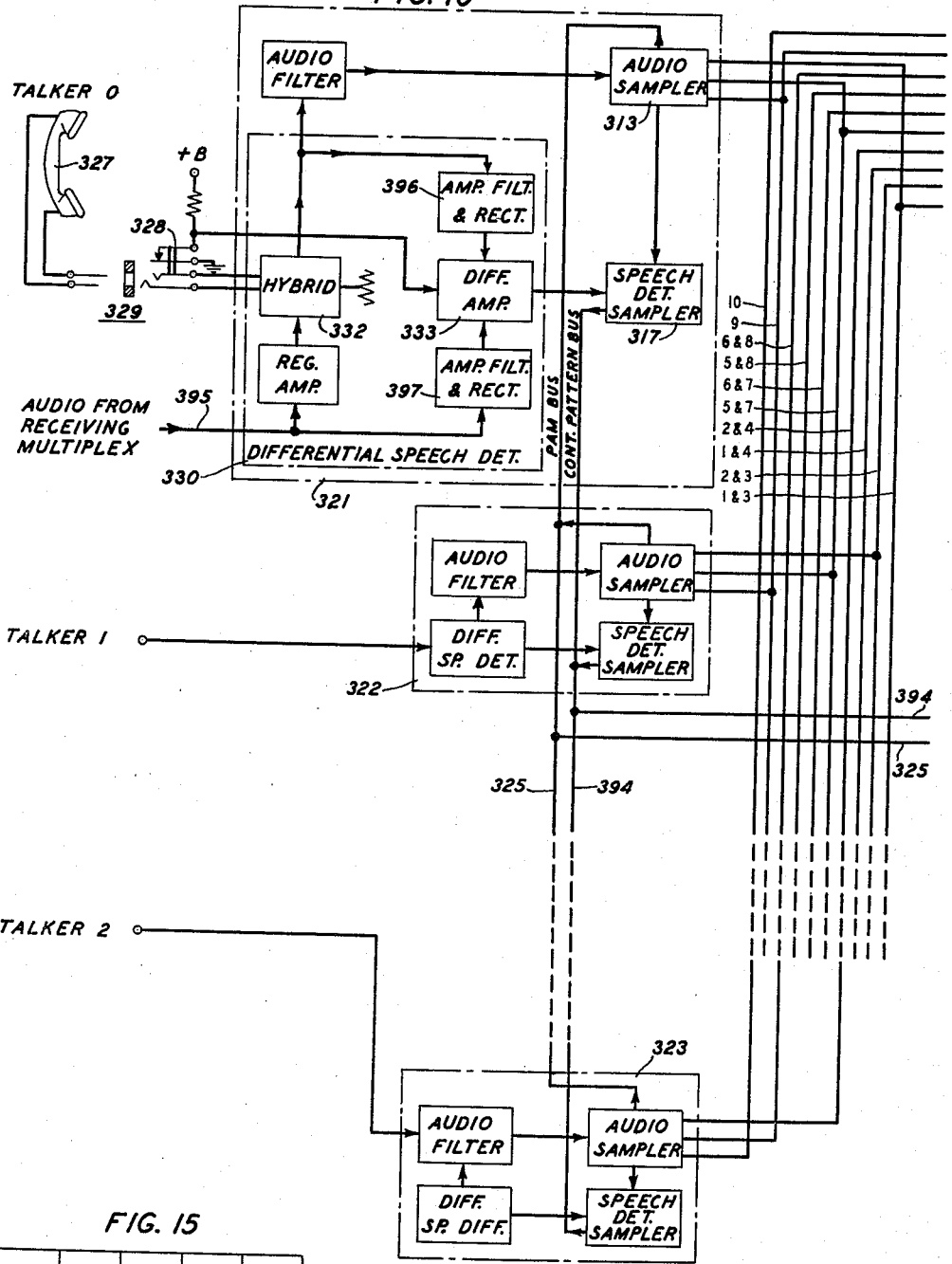

Nov. 22, 1960 — R. L. CARBREY ET AL — 2,961,492
ELASTIC MULTIPLEX SPEECH INTERPOLATION SYSTEM
Filed Sept. 26, 1957

INVENTORS: R. L. CARBREY
C. B. H. FELDMAN
BY Harry C. Hart
ATTORNEY

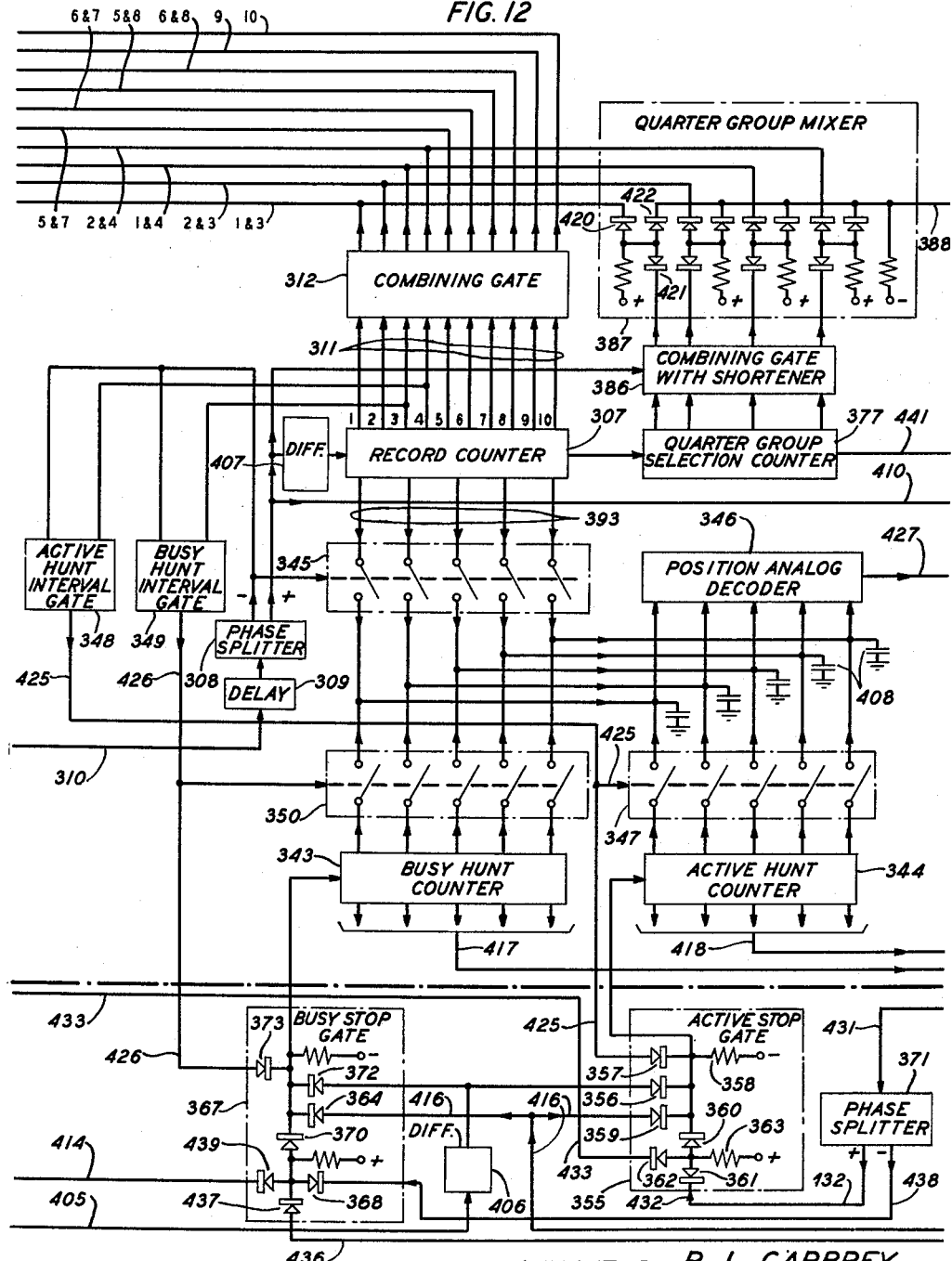

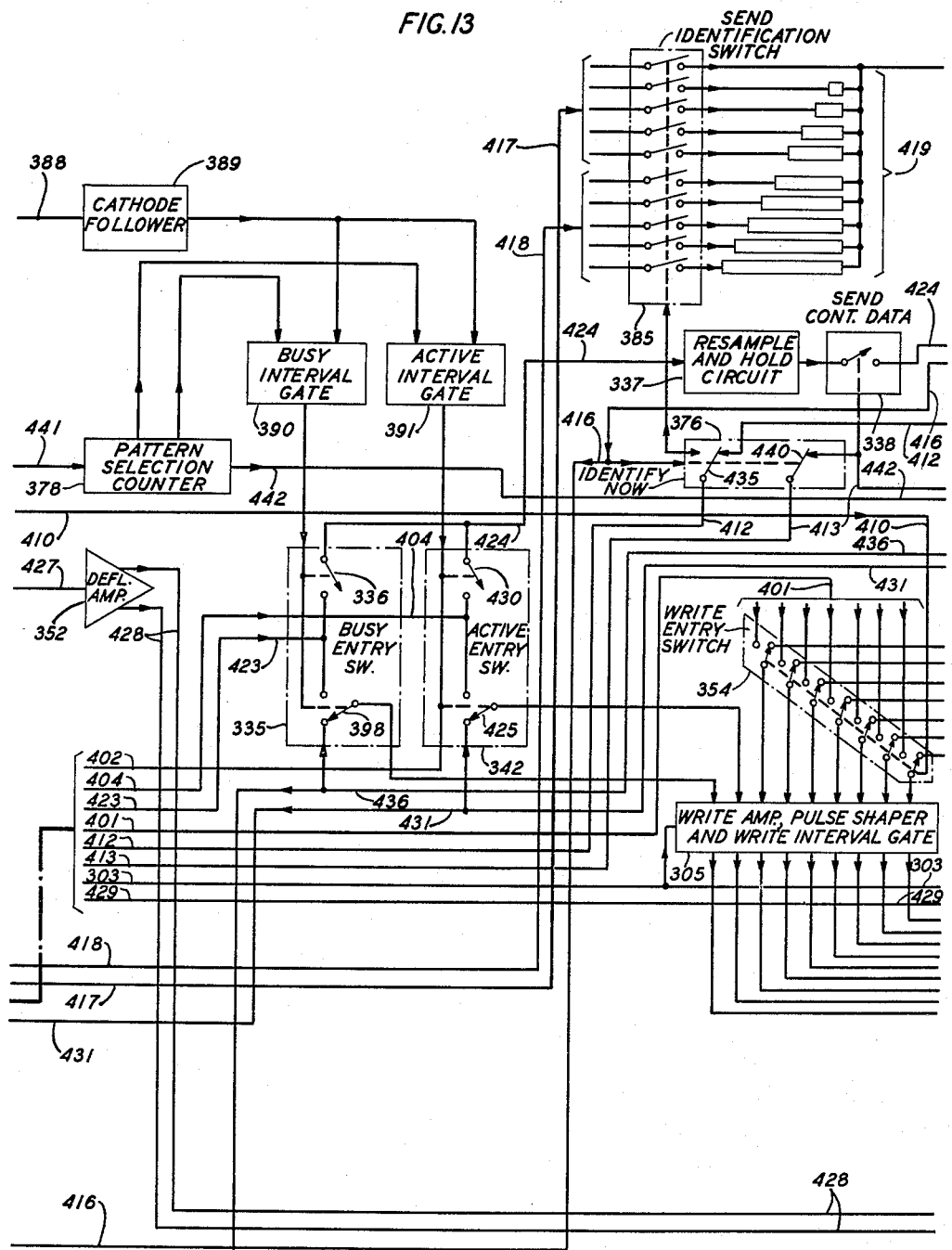

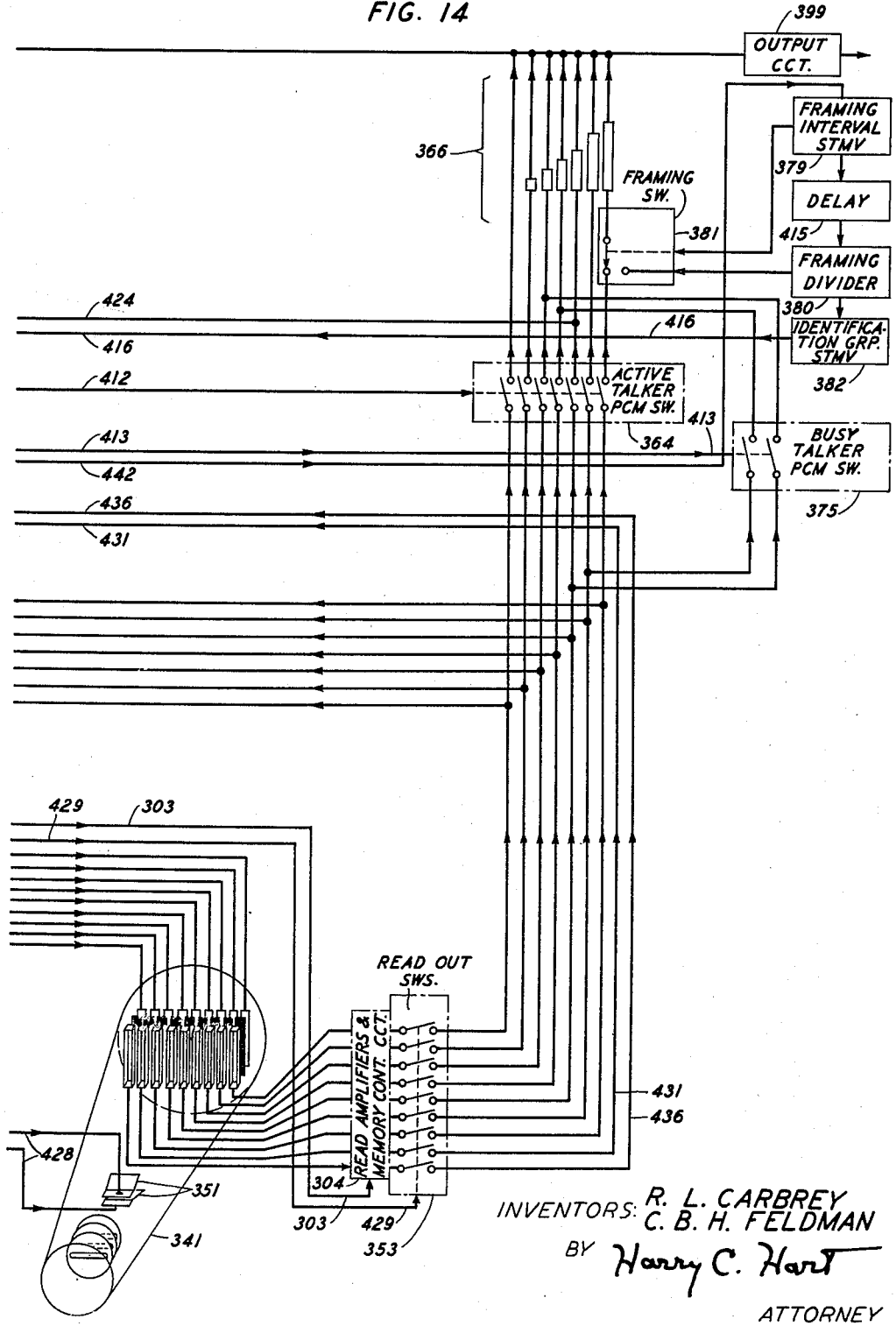

Nov. 22, 1960   R. L. CARBREY ET AL   2,961,492
ELASTIC MULTIPLEX SPEECH INTERPOLATION SYSTEM
Filed Sept. 26, 1957   16 Sheets-Sheet 16

INVENTORS: R. L. CARBREY
C. B. H. FELDMAN
BY Harry C. Hart
ATTORNEY

2,961,492
ELASTIC MULTIPLEX SPEECH INTERPOLATION SYSTEM

Robert L. Carbrey, Madison, N.J., and Carl B. H. Feldman, Clearwater, Fla., assignors to Bell Telephone Laboratories, Incorporated, New York, N.Y., a corporation of New York Filed Sept. 26, 1957, Ser. No. 686,480

12 Claims. (Cl. 179—15)

This invention relates to multiplex telephony by time division techniques. Its principal object is to improve the economy with which costly transmission facilities are utilized. A related object is to arrange for an equitable sharing of the transmission facilities between all the members of a group of subscribers who are momentarily utilizing these facilities, whether the number be large or small, without giving preferential treatment to any one.

It is well known that in the course of an ordinary telephone conversation the period during which either party utilizes the available frequency band and amplitude range of his channel constitutes but a small fraction of the time during which the telephone conversation is in progress. When either party talks volubly and rapidly he makes full use of the facilities; but much of the time he pauses while searching for a word, or listens while his opposite party talks. Such periods of comparative inactivity represent a waste of available transmission facilities. With costly transmission facilities such as an intercontinental undersea cable, this waste is serious.

The statistics of telephone conversations as outlined above are reported in a paper by B. D. Holbrook and J. T. Dixon entitled "Load Rating Theory for Multichannel Amplifiers," published in the Bell System Technical Journal for October 1939, vol. 18, page 624.

This situation has led to proposals, such as that of A. E. Melhose Patent 2,541,932, granted February 13, 1951, to assign the transmission facilities only to such members of a group of subscribers as are momentarily engaged in active talking, and to change the assignments as the activity pattern of the talkers changes. A channel is provided for each talker who is momentarily engaged in uttering a talkspurt. At the conclusion of his talkspurt the channel is assigned to another talker who is just commencing the utterance of a talkspurt, and so on. A system of this kind can be designed on the basis of the average performance of talkers as represented, for example, in the Holbrook-Dixon paper mentioned above. With such a system any given number of transmission channels can handle the calls of a greater number of talkers. Specifically, four channels can handle the calls of seven talkers, six channels those of fourteen, ten those of thirty-two, twelve those of forty, and so on.

This, however, succeeds only so long as each talker of the group behaves like the average talker for whom the system was designed. Occasions arise in which the behavior of the talkers departs widely from the average, so that the demands which they make on the transmission facilities are greater than the facilities can supply. Once all the channels have been assigned in this fashion, another talker of the group who demands a channel must be excluded, at least for one talkspurt. This is preferential treatment, and is therefore objectionable.

To avoid such preferential treatment it has already been proposed, notably in Wilson Patent 2,277,192, granted March 24, 1942, that the sampling rate for each talker be reduced as the number of active talkers increases. With such a system the period required for the sequential examination of the samples of all the talkers of the group is approximately inversely proportional to the number of active talkers. It is thus, in principle, a flexible or elastic system inasmuch as it can accommodate as many talkers as may be momentarily active but at the price, shared equally by all the talkers, of degradation of the transmitted speech as measured by reduction of the sampling rate. Such a system may be termed an elastic speech interpolation (ESI) system.

The present invention, too, is an elastic system in that, when the demands on the transmission facilities are high, no talker is excluded but, instead, the sampling rate for each one is reduced. It goes beyond other systems of this character in several ways. First, it assigns transmission facilities to the several talkers, not on the basis of their talkspurts, each of which may be constituted of a fairly long sequence of speech samples, but on the basis of single speech samples. Second, it recognizes three conditions of relative activity, known as idle, busy and active, respectively, in contrast to the two conditions recognized by past systems. Experience with past systems in which a channel is entirely removed from a talker each time he pauses in his speech has shown that such removal is disturbing to the other party to the conversation, who naturally infers from what he hears that he has been accidentally "cut off." To prevent this disturbing impression it appears desirable to maintain a low grade voice connection even during pauses between speech spurts. Such a low grade connection, requiring a minimum of bandwidth, is capable of transmitting in realistic fashion background noises in the talker's room, the sound of a tapping pencil, grunts, and the like which, while they make small demands on the transmission facility, greatly increase the realism of the telephone conversation.

Third, to obtain the greatest possible advantage in the form of signal-to-noise ratio the present system makes use of pulse code modulation techniques for the transmission of the speech samples of the various talkers. Accordingly, each speech sample of a talker who is momentarily of the active class is translated into a code pulse group capable of representing any such sample over a wide amplitude range, for example a seven-digit group; while the speech sample of a talker of the busy class, intermediate between Idle and Active, is translated into a code pulse group of limited range, for example a two-digit group. On the transmission medium, each such seven-digit code pulse group is paired with one such two-digit code pulse group. To these are added a tenth pulse which serves, in a fashion to be described in detail below, to designate the activity classifications of all of the several talkers, and to enable the receiver apparatus to distribute each speech sample, after decoding, to the party for whom it is intended.

In the instrumentation of the invention, all of a group of incoming lines, each originating at a subscriber's microphone, are examined in rapid, regular rotation. The speech amplitude samples obtained from this examination are then stored in a memory device and the activity classification data for each sample are stored alongside of the sample amplitude itself. The voice amplitude sample is stored in the form of a seven-digit code of electrical conditions and the classification data are stored in the form of a two-digit code. Each sample code is replaced by a new one 8,000 times per second, as the talker's voice wave progresses. Each classification code is replaced by a new one, as the talker's activity pattern changes, at a slower rate, such as 1,000 times per second. Between each recording operation and the next the apparatus conducts an "active hunt"; i.e., it searches the record for active samples, and transmits each one as a seven-digit code pulse group as it finds it, skipping both idle and busy samples. It then conducts a "busy hunt," searching for Busy samples, transmits each one as a two-digit code pulse group as it finds it, skipping active samples and idle samples. Finally, for each such active-busy pair it transmits a tenth digit pulse which operates, in a fashion to be described, to designate the activity classifications of the several talkers. Thus each transmission pulse group consists of seven pulses representing the speech sample of an active talker, followed by two pulses representing a change in the speech sample of another (busy) talker followed, in turn, by a tenth pulse which indicates the activity of still another talker.

It would be possible, in principle, to store in the memory device active samples and busy samples as such without preconversion into pulse code form. The advantages, however, of such conversion into pulse code form prior to recording in the memory instead of afterwards are many. First, it avoids all the difficulties which might arise due to the failure of the memory device to have a linear input-output characteristic requiring, instead, only that the memory device be capable of clearly distinguishing between a mark and a space: between a pulse and no pulse; in other words between two widely different conditions. Second, it permits registration of all samples, idle, busy and active alike, in the same form so that the operation of hunting for samples and the operation of distinguishing between active samples and busy samples can be carried out on the binary code basis with consequent improvement in positiveness of action. Third, this approach reduces the noise which would otherwise be generated by shifts in current level between connected talkers and disconnected talkers and also the noise which would ensue from shifts in the sampling rate which, as indicated above, varies with the demand on the system. Fourth, it permits reading out and rewriting of a sample as often as required without degradation of the stored information.

At the receiver station all of the foregoing operations are in effect inverted by apparatus which is in the main the same as that outlined above but operating, so to speak, "in reverse."

Figure 4:
Figure 3:
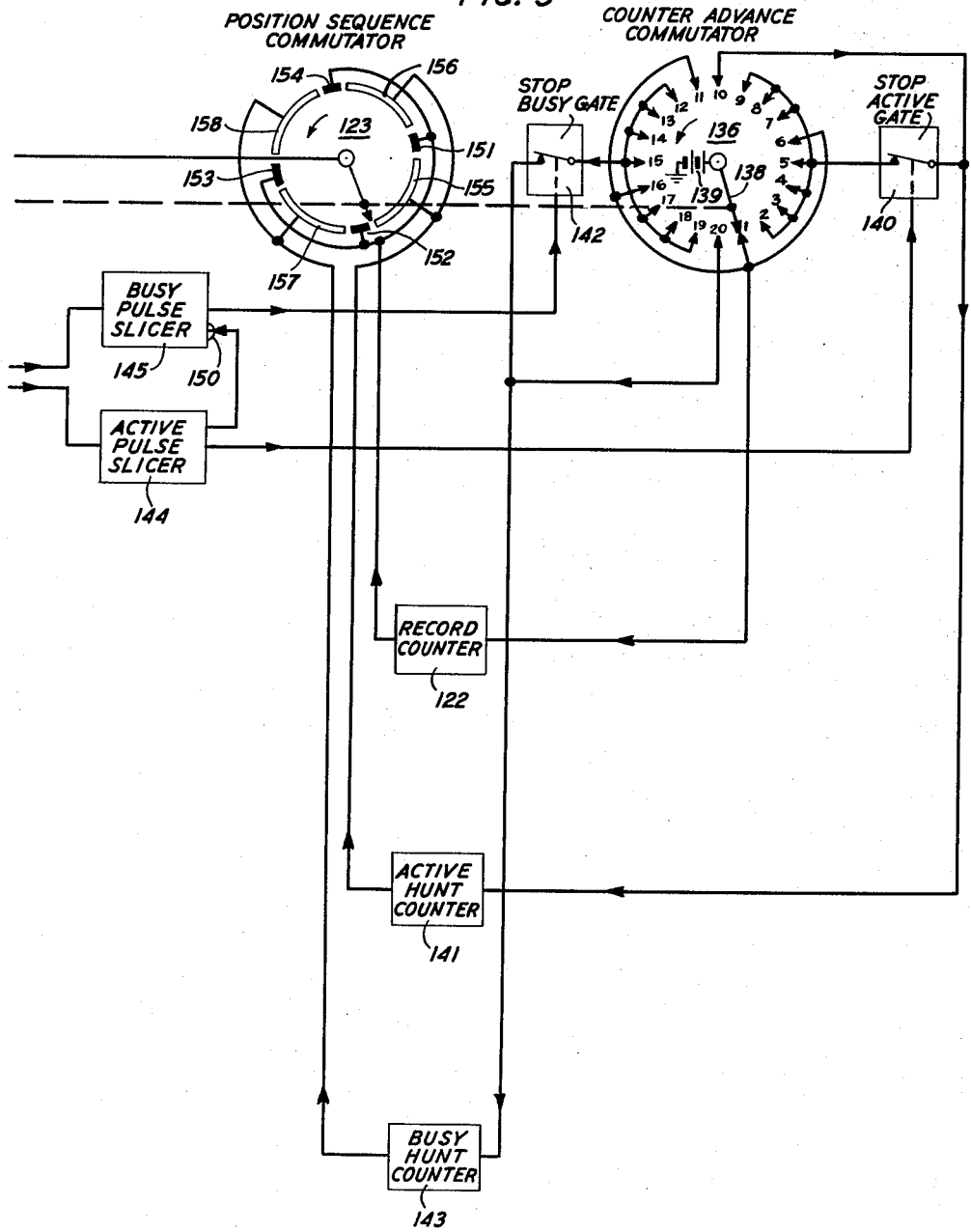
Figure 5:
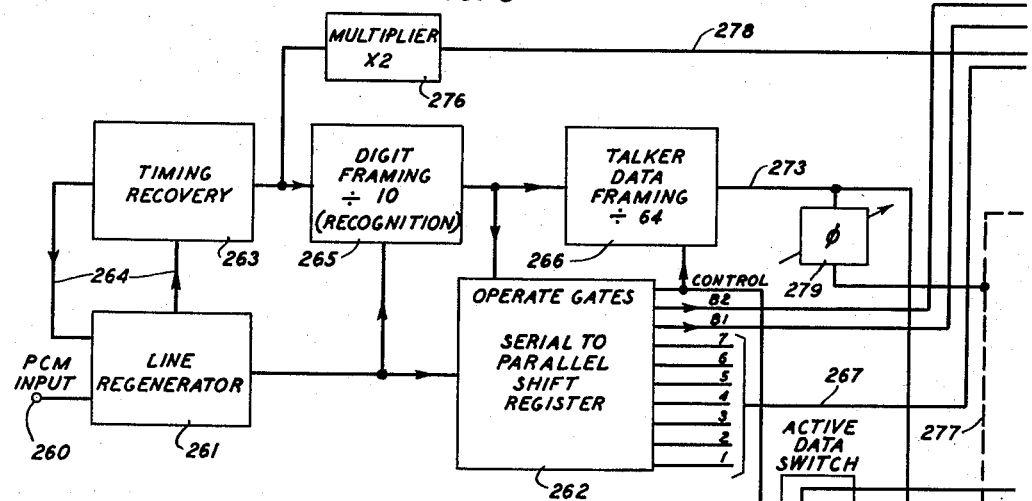
Figure 8:
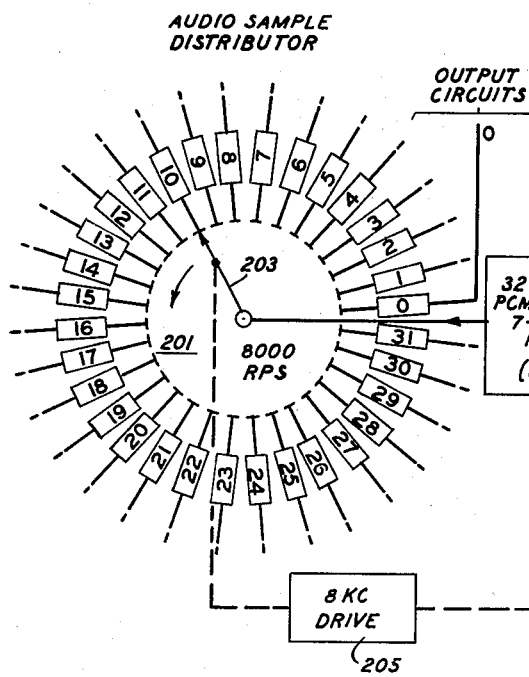
Figure 11:
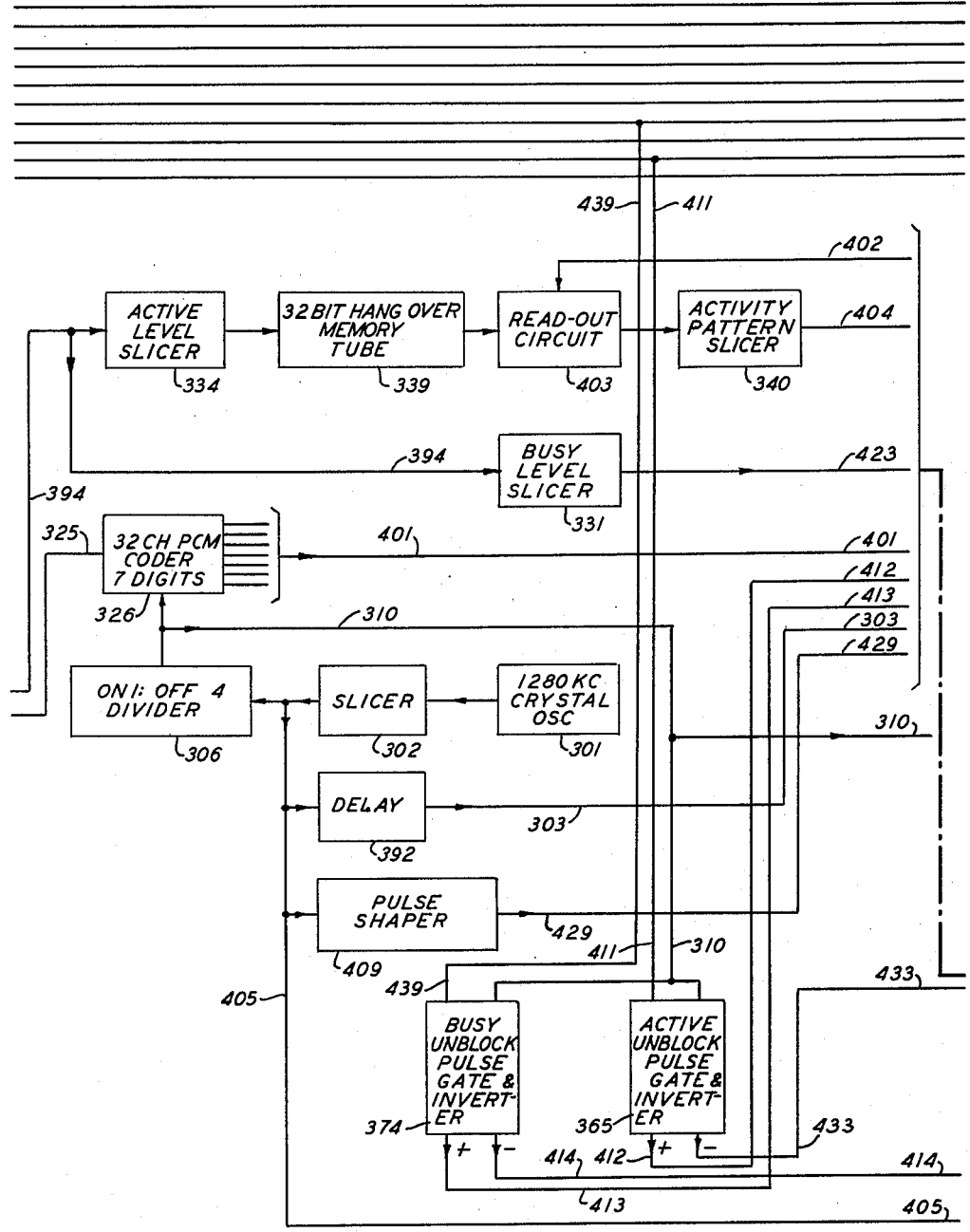
Figure 16:
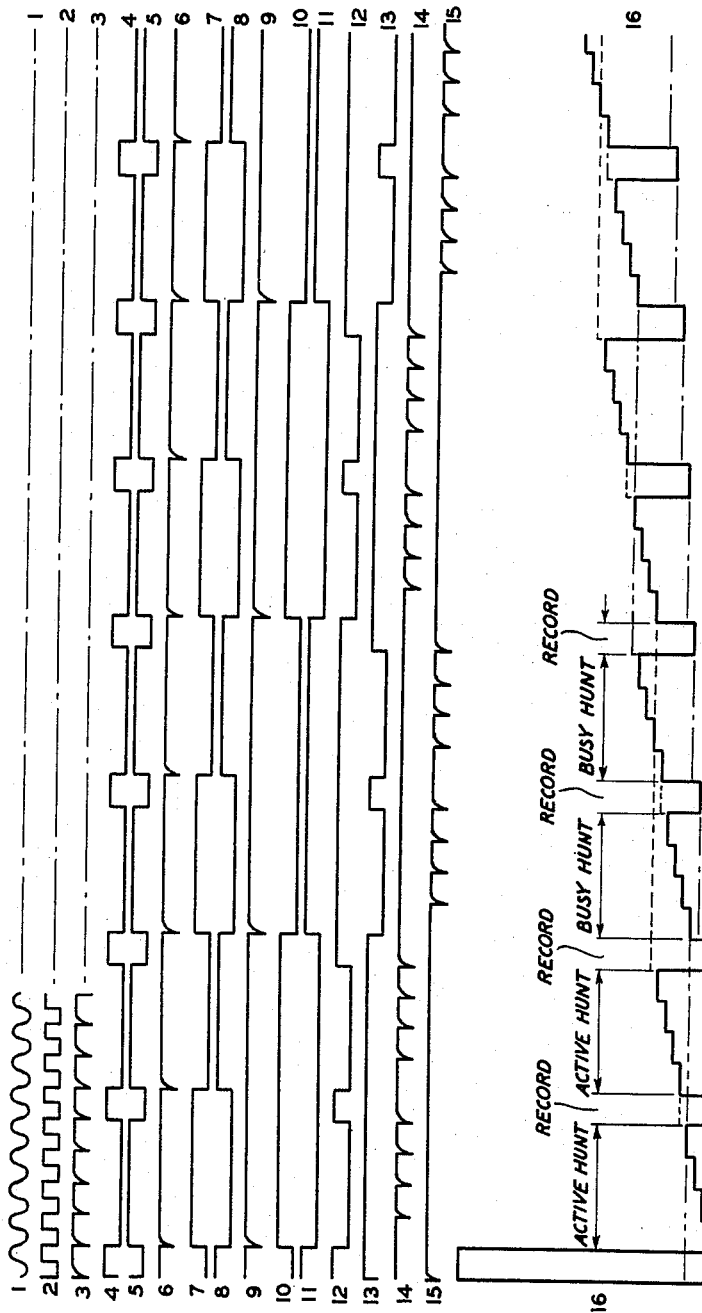
Figure 17:
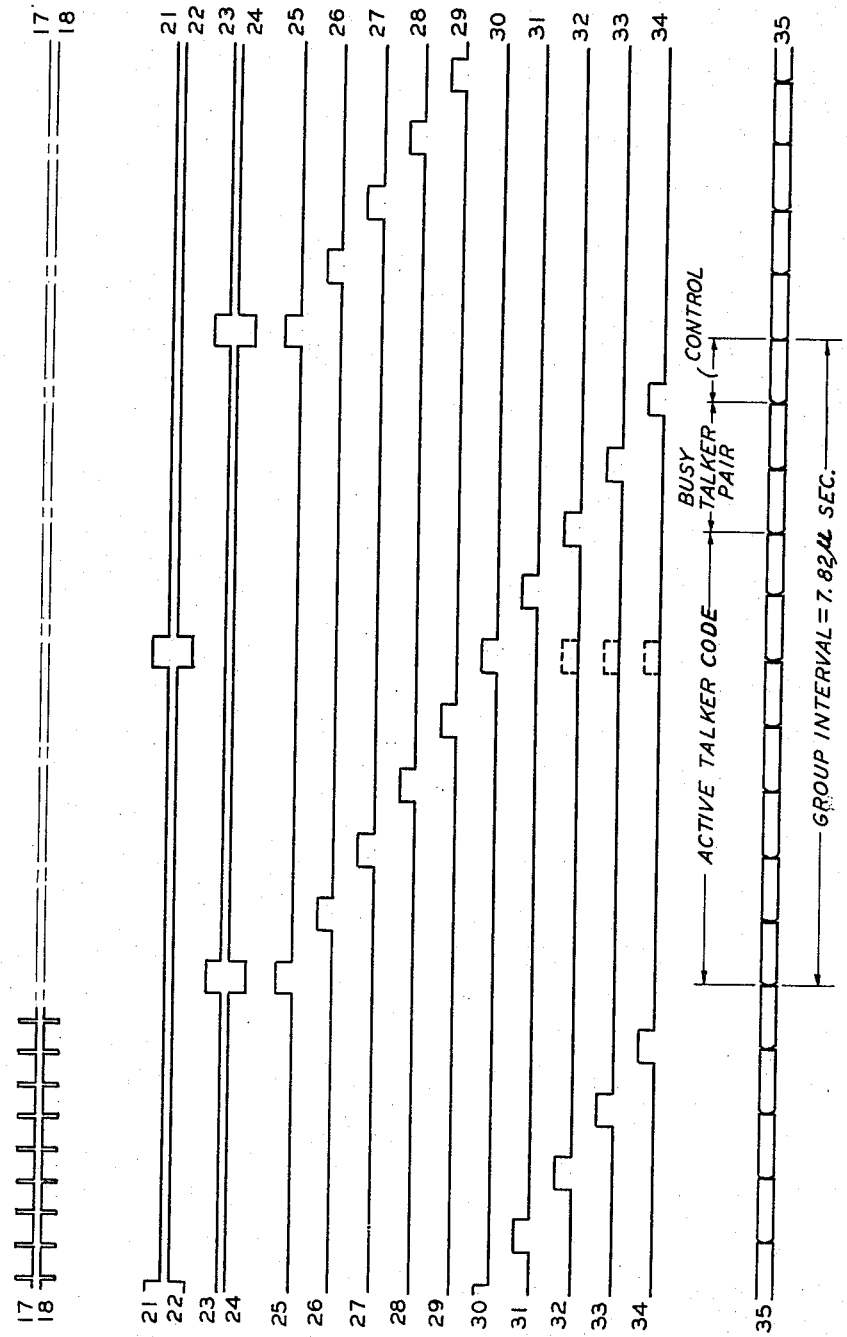
Figure 18:
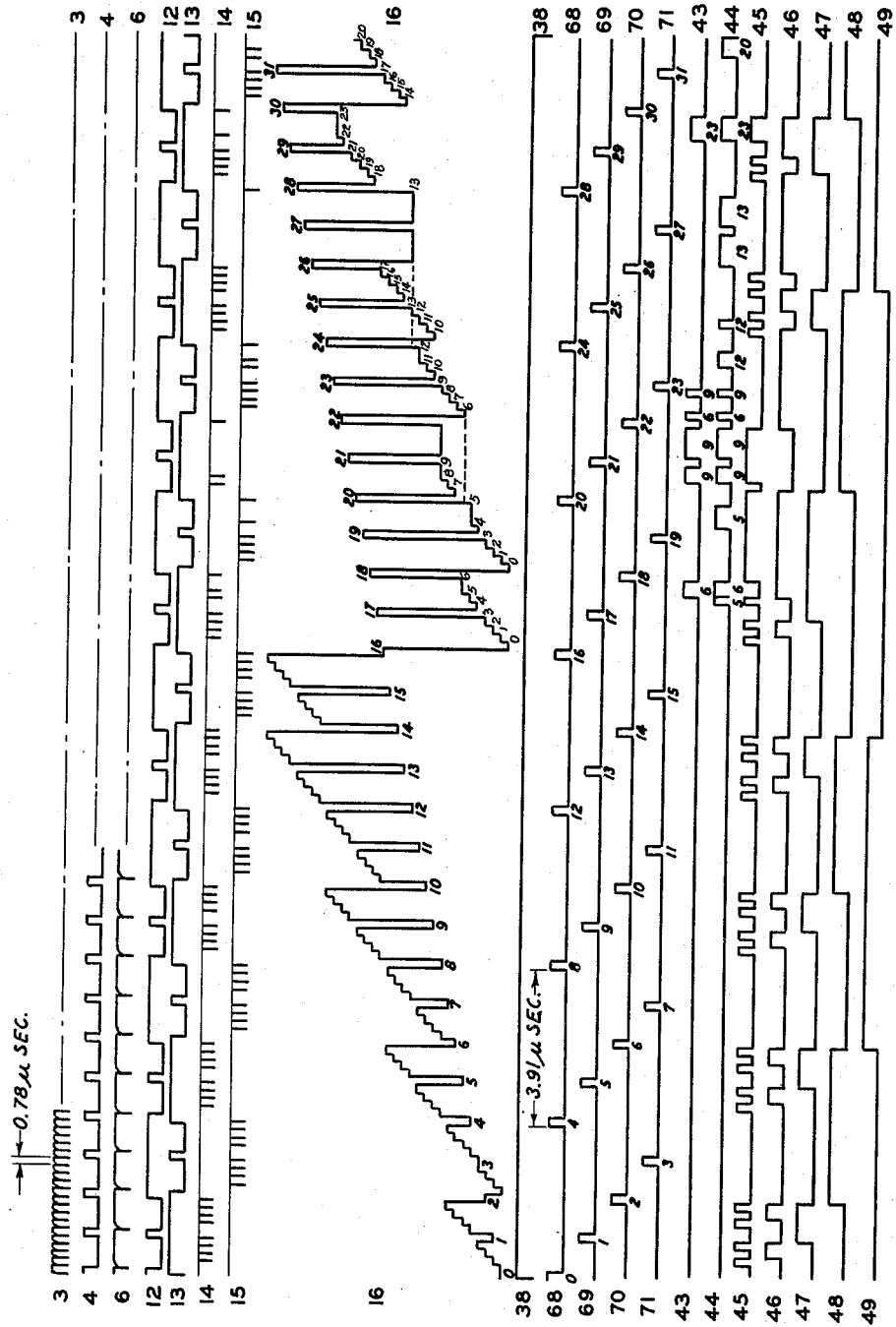

The invention will be fully apprehended from the following detailed description of a preferred embodiment thereof, taken in connection with the appended drawings in which:

Figs. 1 through 3, when arranged in the manner shown in Fig. 4, comprise a simplified functional block diagram of the transmitting terminal of a time division multiplex transmission system in accordance with the principles of the invention;

Figs. 5 through 7, when arranged in the manner shown in Fig. 8, comprise a simplified functional block diagram of a receiving terminal suitable for connection to the transmitting terminal of Figs. 1 through 3;

Fig. 9, given for the purposes of illustration, is a perspective view of a beam storage tube suitable for use with the apparatus of the present invention;

Figs. 10 through 14 when arranged as shown in Fig. 15, comprise a detailed block diagram of the transmitting terminal shown in functional form in Figs. 1 through 3; and Figs. 16, 17 and 18, given for the purposes of illustration, comprise typical waveforms utilized in the transmitting terminal of Figs. 10 through 14.

Referring now to the drawings, Figs. 1 through 3, when arranged as shown in Fig. 4, comprise a functional block diagram of an elastic speech interpolation system in accordance with the invention. Fig. 1 shows two commutators, an audio sample commutator 101 and a control data commutator 102, each commutator comprising thirty-two fixed contacts and a wiper arm. The two wiper arms, 103 and 104, respectively, are shown mechanically coupled together and driven in phase coincidence at 8,000 revolutions per second by a common drive 105. Each of these commutators, and others to be described below, will in practice normally be an electronic device. They are shown here as mechanical commutators for the sake of simplicity and clarity of exposition.

Incoming lines from 32 microphones or telephone instruments, such as microphone 106, are connected to the several fixed contacts numbered 0 to 31, of audio sample commutator 101. These same incoming lines are also connected by way of individual similarly-numbered speech detectors, such as speech detector 107, to the corresponding fixed contacts of control data commutator 102. Each of the speech detectors continuously monitors the speech of the talker who is using the microphone to which it is connected and determines whether or not this speech exceeds a preassigned threshold amplitude. If it does, the speech detector permits a signal to reach the corresponding fixed contact of control data commutator 102 and not otherwise. Thus the speech detector determines at every instant whether or not the talker is in need of a transmission channel. Each of these speech detectors may be a biased voice-operated relay device of a well known variety and needs no further description.

Thus, wiper arm 103 of audio sample commutator 101 picks up the voice amplitude samples of all of the thirty-two talkers in regular rotation, returning to each one the next time after an interval of 125 microseconds $$\left(\frac{1}{8000 \text{ r.p.s.}} = 125 \ \mu s.\right)$$

Similarly, the output of wiper arm 104 of control data commutator 102 carries a signal for each talker who is momentarily active or busy and no signal from any idle talker.

Wiper arm 103 of audio sample commutator 101 is connected to a seven-digit coder 108 which may be of the type described in W. M. Goodall Patent 2,616,060, granted October 28, 1952. For each sample picked up by wiper arm 103, the seven output terminals of coder 108 carry signaling conditions of which the permutations are representative of the amplitude of that sample. This seven-digit code of signaling conditions is applied, by way of the first seven banks of a nine-bank rewrite commutator 109 which will be described below, and only one bank of which is illustrated, and by way of the first seven conductors of a nine-conductor cable 110 to "write" circuit 111 of a nine-position memory device, for example the storage mask 112 of a beam tube 113 having nine independently controllable read-or-write electrodes.

The control signal picked up by wiper arm 104 of control data commutator 102 is applied in parallel to an active speech level slicer 114 and to a busy speech level slicer 115. The control signals of active talkers are sufficient to operate active speech level slicer 114 whose output is normally relayed directly through 32 bit hangover memory tube 116 to output slicer 117 which produces a pulse condition to indicate an active talker and a space condition to indicate an idle talker. Memory tube 116 continues to register a talker as active for some time, 100 milliseconds for example, after active level slicer 114 has ceased to operate because an input talker's speech detector has returned to the busy state from the active state. Tube 116 thereby serves to extend on the time scale the active assignment of a talker to permit adequate transmission of the ends of talk spurts which have dropped below the normal active indication threshold. Hangover slicer 117 passes the regular and extended active conditions to the front contacts of an active data switch relay 118. Control signals of busy talkers, which are of insufficient strength to operate active speech level slicer 114 and yet are above the threshold level to which the speech detectors are set pass busy speech level slicer 115 and to the front contacts of busy data switch relay 119.

Active data switch 118 and busy data switch 119 are enabled and disabled in alternation, each being enabled when and only when the other is disabled, by application to their control terminals the square wave output signals of the two opposite-polarity terminals of a compound control wave generator 120, the details of which will be described below. For the present it suffices that the fundamental frequency of the output of generator 120 is 1,000 c.p.s., so that successive, opposite-polarity half cycles of its output coincide in time with successive groups of four full revolutions of wiper arms 103 and 104 of the commutators 101 and 102. Thus, during four full revolutions of wiper arms 103 and 104 active data switch 118 is operated thirty-two times, being closed once for each of the talker positions. For each determination that a speech sample is of the "active" category a pulse is delivered through active data switch 118 on one-half cycle of the compound control wave; and for each determination that a speed sample is a "busy" one, a pulse is delivered through busy data switch 119 on the next half cycle. When the examination of the speech condition of a talker shows him to be disconnected and hence idle, spaces are delivered at the output terminals during the alternate closures associated with that talker. Thus the signaling conditions on the output conductors of switches 118 and 119 constitute a two-digit code which designates the activity classification of that talker whose speech is concurrently being examined; and the two-digit pulses of this code are spaced apart on the time scale by one-half millisecond.

This two-digit activity classification code is similarly applied by way of the eighth and ninth banks of rewrite commutator 109 and the eighth and ninth conductors of the nine-conductor cable 110, to write circuit 111 of tube 113. Accordingly write circuit 111 is now provided, 8,000 times per second, with the information required to write into the first seven storage positions of nine-position memory tube 113 a seven-digit code representative of the sample amplitude and, 1,000 times per second, with the information required to write into the last two storage positions of memory tube 113 a two-digit code representative of its activity classification. In order that the correlation between the identity of a talker and the magnitude of his speech sample and its classification shall not be lost track of, information must, of course, be written into memory tube 113 at a position which is somehow associated with that talker whose speech sample is being so written. While this correlation can be established in any desired fashion, a convenient one is to provide on mask 112 of tube 113 one location for each of the thirty-two talkers. Thus mask 112 is provided with thirty-two such locations shown, for illustration, as adjacent horizontal rows, numbered in order from one end of mask 112 to the other end, as 0 through 31.

Wiper arms 103 and 104 of commutators 101 and 102 are shown in the positions at which they engage the commutator bars to which microphone No. 10 is connected. Hence, to write into tube 113 the instantaneous sample amplitude code and the activity classification code of talker No. 10, the beam of storage tube 113 must be moved to location No. 10 on mask 112. This positioning of the beam of storage tube 113 is controlled by a position analog decoder 121 which converts the output of a record counter 122 (Fig. 3) passing through position sequence commutator 123, into a beam deflection voltage for application to the deflecting elements 124 of beam tube 113.

Record counter 122 which may be of conventional construction, "counts" the pulses successively applied to its input terminal, and indicates the result of the count as a permutation code group of signaling conditions on its several output conductors. Since, in the present illustration, there are thirty-two talkers, numbered in order from 0 to 31, the tube mask 112 is provided with thirty-two corresponding horizontal rows, similarly numbered. Hence, since in the binary code any number in this range may be written as five binary digits, record counter 122 has five output terminals on which the results of its counts are registered. This code group of signaling conditions is led, through five banks of a position sequence commutator 123, only one bank of which is illustrated, to the five input points of position analog decoder 121.

A suitable memory or storage device is shown in Fig. 9. It may comprise a tube 113 having a cathode not shown, for generating a flat, ribbon-shaped beam of electrons, focusing and accelerating electrodes 127 for directing this beam through secondary electron collector electrodes 128 and barrier grids 129 onto dielectric targets 130 each of which is provided with an individual back plate 131, and deflecting electrodes 124 for bringing this beam to any desired vertical location or target row. Target electrodes 130 are arranged in nine extended vertical strips sufficiently spaced from each other to prevent interaction between them. Of these nine vertical strips the first seven are for the seven-digit code of the signal sample amplitude, and the last two are for the two-digit code representing its activity classification. To write a signal into tube 113, back plates 131 are all biased to a first reference voltage level by the "write" voltage output of read-write square wave generator 132 and the code pulse conditions arriving from rewrite commutator 109 are applied as individual voltage increments to the individual back plates 131. The resulting code appears stored as a distribution of voltages on the several elements of dielectric targets 130 at a horizontal row that is vertically displaced downward from the upper ends of these elements as determined by the instantaneous position to which the ribbon-shaped beam has been deflected. To read any stored signal out of tube 113 it is only necessary to bias all of back plates 131 to a different "read" voltage condition and to cause the electron beam to impact barrier grid 129 at the required horizontal row, whereupon the code stored in that row appears as a permutation of different voltage outputs from the conductors of the several secondary electron collectors 128. Apparatus of this character is well known. Its structure and mode of operation are described in a monograph by M. E. Hines, M. Chruney and J. A. McCarthy, published in the Bell System Technical Journal for November 1955, vol. 34, page 1241.

The "read" condition is established on the electrodes of tube 113 by the "read" output of read-write generator 132 and the selection of the row to be read is determined by the deflection elements 124 of tube 113, by position analog decoder 121 which actuates them, and by the talker-identifying code which at any particular moment is applied to decoder 121.

In principle, a storage device might be employed in which any stored signal may be read out a number of times in succession; that is to say, one in which the operation of reading out does not automatically carry with it the operation of erasure. It is preferred, however, in the present situation, that the read-out operation shall be destructive of the stored information, and that any signal read out of the device shall be immediately restored at the position from which it was just read out, provided it has not changed in the interim. This ensures that it shall be available if needed before the signal sample code shall have been replaced by a new one and at the same time, permits ready substitution of new data for old. The manner is which this rewrite operation is carried out will be discussed below.

The apparatus operates to write (or rewrite) signals into the beam tube 113 and to read them out again in rapid alternation. This alternation between "read" conditions and "write" conditions is carried out under control of read-write generator 132 which delivers an output of 1,280 kilocycles per second and of square waveform. On positive half cycles of its output it energizes read circuit 133 by way of conductor 134 and on negative half cycles of its output it energizes write circuit 111 by way of another conductor 135. When read circuit 133 is energized, write circuit 111 is deenergized and vice versa. Hence, once a particular speech sample code, to be stored in tube 113, has been applied by way of nine-conductor cable 110 to write circuit 111 and by write circuit 111 to the several vertical elements 130 of tube 113, this code is written into tube 113 during the same writing half cycle of the output of square wave generator 132.

Square wave generator 132 also controls the movement of four commutators, the second and the fourth of which have been briefly referred to above. Of these four commutators the first one, counter advance commutator 136, has one bank as illustrated, the second, position sequence commutator 123 referred to above, has five banks, only one of which is illustrated, the third, send code commutator 137, has seven banks, only one of which is illustrated, and the fourth, rewrite commutator 109 referred to above, has nine banks, only one of which is illustrated. These four commutators are arranged to be driven together, with their respective wiper arms remaining always in phase coincidence at a rate of 64,000 revolutions per second and synchronously with the movement of wiper arms 103 and 104 of input commutators 101 and 102. They are preferably driven in stepwise fashion, twenty steps to a revolution. Thus each positive pulse output of square wave generator 132 may advance all four wiper arms by a single step, and twenty full cycles of the output of square wave generator 132 produce a single revolution of the wiper arms of all four commutators.

Counter advance commutator 136 carries twenty fixed contacts or segments, which its wiper arm 138 engages in succession. Wiper arm 138 is connected by way of battery 139 to ground, and hence each time it engages one of the fixed contacts it delivers a pulse to the circuit connected to that contact. These pulses are spaced apart by one full cycle of the output of square wave generator 132, namely by 0.78 microsecond. This interval, which embraces the full cycle of square wave generator 132 and thus one reading interval and one writing interval, is termed a memory interval.

In counter advance commutator 136 the first contact, the sixth contact, the eleventh contact and the sixteenth contact are all connected together, and these in turn are connected to the input terminal of record counter 122. Thus a pulse is delivered to record counter 122 upon the occurrence of every fifth memory interval, that is to say on the engagement of wiper arm 138 with every fifth one of the fixed contacts of counter advance commutator 136. Since wiper arm 138 advances at a uniform rate, four uniformly spaced trigger pulses are generated and applied to record counter 122 for each full revolution of counter advance commutator 136. Thus record counter 122 counts four numbers in each single revolution of wiper arm 138 and hence thirty-two numbers, starting with the number 0 and extending to the number 31, in the course of eight such full revolutions; i.e., in the course of a single revolution of wiper arm 138. Thus there is provided an exact one-to-one relation between the successive increases in the count output of record counter 122 and the successive advances of wiper arms 103 and 104 of commutators 101 and 102 from each segment to the next. Each number to which record counter 122 thus counts appears as a permutation of the voltage conditions on its five output leads. This permutation of voltage conditions on its output leads is applied, by way of the five banks of position sequence commutator 123 as a five-digit input code to position analog decoder 121 which converts this number code into a deflecting voltage for application to deflecting elements 124 of beam tube 113, while preserving the one-to-one relation between talker identity and beam deflection. Thus, for example, if the sample amplitude code and activity classification code of talker No. 10, instantaneously being sampled by audio sample commutator 101, are to be stored in tube 113, the beam of tube 113 must be deflected downward to the eleventh horizontal row on storage mask 112; i.e., row No. 10, the first being row No. 0; and under this condition, provided only that all of the commutators have been started in proper phase relation, the output of record counter 122 is a permutation code for the number 10 and this is translated by way of position analog decoder 121 and beam deflecting elements 124 of tube 113 into a deflection of the ribbon beam to the eleventh row of mask 112; to the row identified as No. 10.

Once the beam of tube 113 has been thus located and the code to be stored has been made ready in write circuit 111 as described above, the proper code is written at the proper point of mask 112 during the same "write" half cycle of square wave generator 132.

Once the signal amplitude sample codes and classification codes associated with them for all of the thirty-two talkers have been stored in tube 113, each in its proper location on mask 112, then, as wiper arms 103 and 104 of commutators 101 and 102 rotate and a new sample is taken, one eight-thousandth of a second for each talker, his old sample code is replaced by a new one. Similarly, old classification codes are replaced by new ones at the slower rate of 1000 times per second. Thus mask 112 remains continuously replenished with coded information indicating, for each talker, his sample amplitude and his activity classification.

It remains, now, to examine mask 112, to hunt for the samples of active talkers and transmit them, to hunt for the samples of busy talkers and transmit them, and to pair each active talker sample code with one busy talker sample code, transmitting the pair together, along with one classification pulse, as a ten-digit code pulse group. The time for the transmission of this ten-digit group is termed a group interval; and the length of this group interval in the present system is 15.6 microseconds, namely one-eighth of the nominal sampling interval of 125 microseconds. These operations are carried out in the following fashion.

As above pointed out, only four out of the twenty contacts of counter advance commutator 136 are connected to record counter 122 so that the record count is only advanced by four numbers in each full revolution of wiper arm 138 of commutator 136.

The remaining sixteen contacts of counter advance commutator 136, which define the remaining sixteen memory intervals out of the twenty which transpire in each full revolution of commutator 136, are divided equally between the active hunt operation and the busy hunt operation. Thus, during every full revolution of wiper arm 138 of counter advance commutator 136, one fifth of its time is devoted to the recording of speech samples and their activity classifications, and four fifths of its time are allotted to hunting for recorded information. Thus the second, third and fourth and fifth contacts of commutator 136, and also the seventh, eighth and ninth contacts are all strapped together; and their combined outputs are connected through stop active gate 140 to active hunt counter 141. The tenth contact is connected directly to active hunt counter 141. Similarly, the twelfth, thirteenth, fourteenth, fifteenth, seventeenth, eighteenth and nineteenth fixed contacts of commutator 136 are all strapped together, and their combined outputs are connected through stop busy gate 142 to busy hunt counter 143. The twentieth contact is connected directly to busy hunt counter 143.

As shown, wiper arm 138 of counter advance commutator 136 is engaged with the first fixed contact. While arm 138 is proceeding from the first fixed contact to the second fixed contact, square wave generator 132 shifts from its "write" condition to its "read" condition, and the beam of memory tube 113 examines mask 112 at the location defined by the number presently being generated by active hunt counter 141 to determine whether or not the corresponding talker happens to be an active one. This might, for example, be talker No. 29. When wiper arm 138 of counter advance commutator 136 engages the second fixed contact, it applies a pulse to the input point of active hunt counter 141 and causes it to advance by one number; i.e., in the example, to the number 30. As wiper arm 138 continues its advance to engage the third, fourth and fifth contacts in succession, active hunt counter 141 is stepped along once for each pulse which reaches it through stop active gate 140. In the example taken, this advances the count to the No. 31, No. 0 and No. 1 in succession. This search however, has used up the first group of active hunt fixed contacts of counter advance commutator 136 so that the next operation must be a recording operation. This must therefore be taken out from the active hunt to permit the next recording operation to take place. Therefore examination of the mask position now registered in active hunt counter 141, is deferred for one memory interval, during which the operation of recording the sample code (and perhaps the activity classification code too) for the next talker, i.e., No. 11, takes place in the fashion described above for the first recording operation.

When counter advance commutator 136 is advanced to contact six, record counter 122 is advanced one count, to talker No. 12 in the example so it will be ready when needed at the end of the active hunt operation. As soon as the recording operation for talker No. 11 has been completed the search thus deferred for one group interval is resumed, and the active hunt count advance pulses due to the seventh, eighth, and ninth contacts are produced by the progressive advance of wiper arm 138. This would advance the count to No. 2, No. 3 and No. 4 if the search did not result in the discovery of any active talker.

Suppose, however, that in this instance talker No. 2 is an active one. This activity is registered in the third, or No. 2, row of mask 112 as an On condition in the eighth column and another On condition in the ninth column. On the next "read" half cycle of the output of read-write generator 132 these conditions are read out by read circuit 133. Read circuit 133 transfers them to active pulse slicer 144 and to busy pulse slicer 145, respectively. Energy thus passing through active pulse slicer 144 is applied to the control terminal of stop active gate 140, thus to disestablish the pulse path from commutator 136 to active hunt counter 141, and so to prevent application of the next pulse from counter advance commutator 136 to active hunt counter 141 which would otherwise advance it. Active hunt counter 141 is thus arrested and, through the corresponding arrest of the pulse input to position analog decoder 121, the beam pauses on the No. 2 row, while commutator 136 proceeds in its advance without interruption. Active hunt counter 141 remains in the condition indicating that talker No. 2 is active and, because of this same activity condition, stop active gate 140 remains on open circuit and active hunt counter 141 is prevented from advancing further. Thus, whenever an active talker position is located on mask 112 of memory tube 113, the advance of active hunt counter 141 is halted until the end of the current active hunt interval. As the end of the active hunt interval and seven-digit code representing the amplitude of the voice sample of the active talker thus identified is read out of storage mask 112 and onto the transmission medium in the form of a sequence of pulses recurring at uniform intervals: that is to say as a sequential code pulse group.

The manner in which this read-out is acomplished is as follows. The beam of memory tube 113 is positioned by active hunt counter 141 and position analog decoder 121 at that location of mask 112 at which the active talker's voice sample code and activity classification code are stored. Upon the occurrence of the "read" half cycle of the output of square wave generator 132 both of these codes are read out of mask 112 by way of read circuit 133. The first seven digits, i.e., the full sample amplitude code, are applied to the fixed contact, such as contact 149, of each of the seven banks of send code commutator 137. At the end of the active hunt interval wiper arms, such as arm 146 of commutator 137, pass these fixed contacts and this code is applied by way of the wiper arms to a group of seven outgoing conductors such as conductor 147. In addition, two selected digits of this seven-digit code, preferably those of lowest denominational order, are applied to two members of a bank of two oppositely located fixed contacts, such as 148 and 149, of send code commutator 137. Next time the wiper arms pass these fixed contacts they pick up the last two digits of the seven-digit sample code and apply them to two of this group of seven outgoing conductors. The code which thus appears simultaneously on seven conductors may be applied to seven equally spaced input points of a shift register or a conventional delay line distributor which operates to convert them into a sequence in time of pulses on a single conductor.

The search for active talkers, the location and identification of talker No. 2 as active, and the transmission of the code representing his momentary sample has now used up the remainder of the second active hunt interval. It is now time to record in memory tube 113 a new sample from the next talker in order, namely, talker No. 12. This is recorded at the position of mask 112 determined by the number to which record counter 122 was set by the earlier advance of wiper arm 138 of counter advance commutator 136, namely, to its sixth fixed contact and by the corresponding deflection of the beam to that position by position analog decoder 121. The code representing the speech sample of the talker No. 12 is recorded in the No. 12 row of mask 112 upon the next "write" half cycle of square wave generator 132. Meantime, wiper arm 138 of counter advance commutator 136 has momentarily engaged the eleventh fixed contact which delivers a pulse to record counter 122 and advances it by one number, thus to establish the code corresponding to talker 13 which will be needed half way through the busy hunt operation.

Three recording operations have now taken place and, between them, two active hunts. It is now time to commence and carry out a hunt for busy talker samples. This is carried out in the identical fashion as that in which the active hunt was carried out, with the exception that the pulses from counter advance commutator 136 are applied by way of stop busy gate 142 to busy hunt counter 143. Counter 143, the construction of which may be identical with that of active hunt counter 141, is advanced in its count by one unit each time a pulse is applied to it, and deflects the beam of tube 113 downward by one row for each increase in the count. Provided no busy talkers are found, busy hunt counter 143 is advanced rapidly by four numbers in succession, wehreupon a pause takes place for the recording of a new sample (e.g., that of talker No. 13) after which the busy hunt is resumed and proceeds as rapidly as possible through the next four counts, and thus through the next four positions on mask 112 in the search for a busy talker, whereupon the busy hunt ceases, a new sample (that of talker No. 14) is recorded, and the active hunt recommences.

During the course of either of these two busy hunts, a busy talker may be identified. Each time a busy talker position is located, busy hunt counter 143 is halted in its advance. This halt is effected by the application of a busy signal, derived on the next "read" half cycle of the output of read-write generator 132, from the ninth read-out terminal of read circuit 133, through busy pulse slicer 145 to the control terminal of stop busy gate 142 which is thus opened to prevent the further application of advancing pulses to busy hunt counter 143, and so to halt the busy hunt.

Busy pulse slicer 145, which may be of any desired construction, delivers an output when a pulse is present on its input lead and in the absence of an inhibiting pulse on its inhibiting terminal 150. The inhibiting pulse may be derived from the output terminal of active pulse slicer 144. Hence a signal which is in excess of the busy threshold, as determined by busy level slicer 145 and recorded in the ninth column of mask 112 of tube 113, actuates stop busy gate 142 only provided active pulse slicer 144 is not simultaneously actuated. That is to say, provided an On condition is not also recorded in the eighth or "active" column of the mask 112. With this arrangement, either stop active gate 140 or stop busy gate 142 may be disabled, but both may not simultaneously be disabled.

Once a busy talker position has been thus located on mask 112 and the busy hunt is halted, the voice sample code may be read out of mask 112 to any desired extent. In accordance with a feature of the present invention only two selected digits, preferably those of least denominational significance, are read out of mask 112 for each busy talker. This plan is instrumented, in the present example, by connection of only two out of seven sample code digit output conductors of read circuit 133 to two "read busy" contacts, such as contact 148, of two banks of send code commutator 137. On the next half revolution of send code commutator 137 these two digit conditions are simultaneously picked up by the two corresponding wiper arms and applied, as in the case of the seven-digit code for the active talker sample, to two input points of a shift register or a conventional delay line distributor which converts them into sequential pulse code on a single conductor. By proportioning the length of the delay line and arranging the distribution of the fixed contacts on send code commutator 137 in well known fashion, the two digits for this busy talker will find themselves arranged in regular sequence immediately following the seven digits of the previous active talker.

The system as thus far described nominally skips all idle talkers, assigning no time to them whatever. But to determine whether a talker is idle, active or busy requires a time interval which, while small, is not zero. Such time intervals accumulate; and if a long unbroken sequence of idle talkers is found, an entire group transmission interval may be used up. To prevent waste of transmission facilities during this time the invention provides, as a refinement, that a seven-digit pulse group representing the signal sample of every eighth talker shall be transmitted in any event whether he be idle, busy or active, provided no active talker has been heretofore discovered in the first seven memory intervals. Similarly provision is made to transmit a two-digit pulse group for every eighth talker whether he be idle, active or busy, provided no busy talker has been theretofore discovered in the next seven memory intervals. In this way a regular sequence of pulses is transmitted with consequent advantages from the standpoint of regularity, even though a small fraction of the code pulse groups may represent samples with an amount of precision that is not in accordance with the general plan of the invention. That is to say, either a two-digit pulse group may represent the sample of an active talker, a seven-digit pulse group may represent the sample of a busy talker, or either may represent the sample of an idle talker.

This plan is instrumented in the following fashion. Once the code pulse group of an active talker has been read back into the same location of tube 113 in case it should be needed shortly, active hunt counter 141 must be advanced to the next count in order to permit the count to continue during the next active hunt interval. But with an active talker stop active gate 140 is now open and the normal path for the counter advance pulses is blocked. Hence, to advance active hunt counter 141, stop active gate 140 must be bypassed. This is accomplished by the connection of the tenth fixed contact of counter advance commutator 136 to active hunt counter 141 directly, instead of by way of stop active gate 140. With this arrangement, active hunt counter 141 is advanced when wiper arm 138 engages the tenth fixed contact, without regard to the activity of the talkers. This occurs after the "read" and "write" portion of the current memory interval. During the read portion a seven-digit sample code is read out of mask 112 and onto the transmission medium for a talker who may not, in fact, be "active." This advance allows stop active gate 140 to close, in preparation for the next active hunt. Active hunt counter 141 then rests at the number to which it has been thus advanced and remains there until after the completion of the ensuing busy hunt and the commencement of the next active operation, ten memory intervals later. The count at which it rests determines the first position sampled during that next active hunt.

The same considerations hold for the advance of busy hunt counter 143 after wiper arm 138 of counter advance commutator 136 has engaged fixed contact No. 19. This is accomplished by connection of fixed contact No. 20 directly to busy hunt counter 143, and not by way of stop busy gate 142. Hence, at this part of the cycle, busy hunt counter 143 is advanced by one single count independently of the activity of the talkers.

As above indicated, greater ease and flexibility of operation of storage tube 113 are obtainable provided it is not insisted that the read-out operation shall be non-destructive of the recorded information. The memory tube of Fig. 9 is of this character. Hence each time a stored code is read out of the memory, the record is erased. Inasmuch as it may be needed again within a very short time interval, it is desirable that each time such a code is read out it be immediately written in again at the same location on mask 112. This is accomplished by the connection of the code-bearing output conductors of read-out circuit 133 by way of rewrite commutator 109 immediately back to write circuit 111. The various fixed contacts of rewrite commutator 109 are so arranged with respect to the arrangement of the fixed contacts of position sequence commutator 123 that the beam position is not altered by a change in the output of any of the counters during this rewriting operation.

The sequence of operations described above may be summarized as follows. In a single revolution of the commutators 109, 137, 123 and 136 four short, equally spaced recording operations take place, each occupying the "write" half of a single memory interval. The first of these four recording operations is followed by an active hunt interval, four times as long. So, too, is the second recording operation. The third recording operation is followed by a busy hunt interval, four times as long. So, too, is the fourth recording operation; and this completes the cycle. The sequence of these operations is determined by position sequence commutator 123, and, in particular, by the arrangement of its five banks of fixed contacts. Thus each bank has four short fixed contacts, such as contacts 151, 152, 153 and 154, equally spaced around its periphery and these are all connected to the output terminals of record counter 122. Between contacts 151 and 152 of each bank, as also between contacts 154 and 151, are two longer contacts 155 and 156, respectively, which are connected together, and to the output terminals of active hunt counter 141. Between contacts 152 and 153 of each bank, as also between contacts 153 and 154, are two longer contacts 157 and 158, respectively, both of which are connected to the output terminals of busy hunt counter 143. The five banks are necessitated by the fact that each of these counters 122, 141 and 143 has five output terminals, which require connection by way of position sequence commutator 123 to the five input terminals of position analog decoder 121.

Position analog decoder 121 is a simple pulse code modulation decoder of the "flash" type as described, for example in E. W. Adams Patent 2,592,228, granted April 8, 1952. It operates to convert the five-conductor simultaneous (parallel) binary code on its input terminals to a quantized analog voltage suitable for application to deflecting elements 124 of storage tube 113 and therefore for positioning its ribbon beam. Because of the discontinuous nature of its input, the deflection of the beam is similarly discontinuous; and as a result the beam is rapidly switched or jumped to that location of mask 112 which is specified by the particular counter momentarily connected to the decoder; and this takes place at the commencement of each "write" or "hunt" interval. The beam is then stepped along storage mask 112, row by row, until an active talker location or a busy talker location is located, as the case may be.

It will be noted that while the operation of hunting for active and busy talker samples and the transmission of these samples takes place in an irregular fashion such that the rate at which new samples are transmitted for any particular talker depends on the demands to which all the talkers subject the system, the operations of recording signal sample codes and activity classification codes in the memory are entirely regular and remain always in synchronism and in phase with the advance of wiper arms 103 and 104 of commutators 101 and 102. Wiper arms 103 and 104 rotate at 8,000 revolutions per second; that is to say, each full rotation requires 125 microseconds and this period is divided into thirty-two equal parts by the commutators, so that a time interval of 3.9 microseconds is allotted to each talker by commutators 101 and 102. The remaining commutators 109, 137, 123 and 136, rotate at 64,000 revolutions per second and carry out four recording operations in the course of each revolution. Each recording operation involves the advance of record counter 122 by a single count and hence the deflection of the electron beam from one horizontal row on mask 112 to the next one. Four such advances take place in each revolution of counter advance commutator 136. Hence the beam is advanced in the course of thirty-two such recording operations, from one end of mask 112 to the other, and this requires eight full revolutions of counter advance commutator 136. With 64,000 revolutions per second and twenty memory intervals per revolution, the length of a memory interval is 0.78 microsecond. The time required for four recording operations, namely the time for one revolution, is hence twenty memory intervals or 15.6 microseconds; and the time required for eight full revolutions is eight times as great or 125 microseconds. Hence the full recording of all thirty-two talker samples in regular sequence takes identically the same time, namely 125 microseconds, whether viewed from the standpoint of commutators 101 and 102 or from the standpoint of commutators 109, 137, 123 and 136 and mask 112 of storage tube 113.

It remains to consider the generation and transmission of control data which are required to furnish the receiver apparatus with unambiguous information as to the talker activity pattern. These operations are performed by the apparatus in such a way as to make most effective and economical use of available transmission facilities, as follows. As described above, control data commutator 102 delivers a signal through speech level slicer 114 and hangover circuit 116 and hangover slicer 117 to active data switch 118 each time wiper arm 104 engages the fixed contact of an active talker; and it delivers a signal to busy data switch 119 each time wiper arm 104 engages the contact of a busy talker. These two switches are enabled, in alternation, by compound control wave generator 120, at a rate of 1000 cycles per second. Thus active data switch 118 may be enabled for one commutator revolution out of four, and busy data switch 119 for one revolution out of the next four. For any particular talker, for example talker No. 10, the enabling signal recurs once in eight revolutions of wiper arm 104 of control data commutator 102 or, in other words, once every millisecond. Aside from this delay, of one millisecond at most, which is of no significance in speech transmission, the required control data can therefore be sent to the receiver station in the form of a single pulse occurring in the tenth pulse position of each transmission pulse group and which represents, on one revolution of control data commutator 104, the active classification of the particular talker and, on a later revolution of the same commutator, his busy classification. In other words, the significance of the pulse which appears in this tenth pulse position of each pulse group is related, as only one digit of a two digit code group, to the pulse in the tenth pulse position of the similarly numbered pulse group in the ensuing half cycle of the enabling wave of control generator 120, as the second digit. Thus in four revolutions of control data commutator 102 thirty-two control data digit pulses (one per group interval) serve to transmit the pattern of active talkers while the ensuing thirty-two control data digit pulses, derived in the course of the next four revolutions of the commutator (one per group interval), serve to transmit the talker busy pattern. Thus if active level slicer 114 is operated when wiper arm 104 of control data commutator 102 engages No. 10 segment, a pulse is transmitted to the receiver station in the tenth position of the tenth pulse group. This indicates to the receiver apparatus that talker No. 10 is at the moment, active. If, on the other hand, active level slicer 114 is not operated, a space is transmitted in the tenth pulse position of the same transmission pulse group. This indicates that talker No. 10 is not, at the moment, active. He may be busy, or his line may be idle. If he is busy, busy level slicer 115 is actuated when commutator wiper arm 104, four revolutions later, engages the No. 10 segment. In this event a pulse is transmitted in the tenth pulse position of the forty-second transmission pulse group: in the tenth group of the second half of the transmission cycle. This indicates to the receiver that talker No. 10 is busy or active. (Which of these two conditions is correct has already been settled by the transmission of a pulse of a space in the tenth position on the first revolution.) If talker No. 10 is idle, a space is transmitted in this pulse position. The enabling pulses of the control wave are so timed as to creep, throughout each half-millisecond enabling interval, one commutator segment with respect to the phase of the rotation of wiper arm 104 of control data commutator 102. Thus, on the first revolution of wiper arm 104, "active" data and "busy" may be picked up, stored, and transmitted, in accordance with the following schedule:

| Commutator Revolution No. | Talker Nos. |
| --- | --- |
| 1 | 0, 4, 8, 12, 16, 20, 24, 28 (Active). |
| 2 | 1, 5, 9, 13, 17, 21, 25, 29 (Active). |
| 3 | 2, 6, 10, 14, 18, 22, 26, 30 (Active). |
| 4 | 3, 7, 11, 15, 19, 23, 27, 31 (Active). |
| 5 | 0, 4, 8, 12, 16, 20, 24, 28 (Busy). |
| 6 | 1, 5, 9, 13, 17, 21, 25, 29, (Busy). |
| 7 | 2, 6, 10, 14, 18, 22, 26, 30 (Busy). |
| 8 | 3, 7, 11, 15, 19, 23, 27, 31 (Busy). |

The transmission of the necessary control data in this interlaced fashion restricts the transmission of complete classification information as to any particular talker to one such indication in every sixty-four transmission pulse groups; but, with the operating speeds discussed above, sixty-four pulse groups are transmitted in a single millisecond. Hence no significant speech delay results, while optimum economy is secured in the transmission of the control data.

Inasmuch as each of these sixty-four pulse groups consists of ten pulses (or spaces), the repetition rate of the train of pulses as transmitted is 640,000 pulses per second.

The final selection of the control data is represented as being carried out by two double-pole double-throw switches, active data switch 118 and busy data switch 119. These switches are independently controlled by a train of pulses from compound control wave generator 120 which repeats at one millisecond intervals; i.e., with a repetition rate of 1000 cycles per second. During all of the searching operations, these switches remain in the positions shown, so that the control data that may be read out of memory tube 113 are immediately written in again at the same locations, by way of rewrite commutator 109. When a new pulse code group is being recorded for the talker whose turn it is to have the benefit of the control data transmission pulse position, one and only one of the two data switches 118 or 119 operates, thus to apply the corresponding digit to the eighth or the ninth column of memory tube 113, and the other one of these two digits to the other one of these two columns on a later revolution of control data commutator 102. Thus, during any single revolution of rewrite commutator 109, one and only one bit of control data is subject to change.

The receiver apparatus, shown in Figs. 5 through 7, when arranged as shown in Fig. 8, may be in large part a duplicate of the transmitter apparatus. In particular, it comprises a beam storage tube 213 and controls therefor which may be identical with those heretofore described in connection with the transmitter apparatus. As in the case of the transmitter, these controls include four commutators of which the wiper arms rotate at 64,000 revolutions per second. The first commutator, counter advance commutator 236, has one bank, the second commutator, position sequence commutator 223 has five banks only one of which is illustrated, the third commutator, receive and rewrite code commutator 237, has seven banks only one of which is illustrated, and the fourth commutator, decode commutator 209 has nine banks only one of which is illustrated. The controls also include a distribution counter 222. Its construction and operation are the same as those of record counter 122 at the transmitter station. The controls also include an active hunt counter 241, a busy hunt counter 243, a stop active gate 240, a stop busy gate 242, an active pulse slicer 244, a busy pulse slicer 245, a position analog decoder 221, and a basic timing source comprising a square wave read-write generator 232 whose output operates to advance all four commutators 209, 237, 223 and 236 together in steps, 20 steps per revolution.

Incoming code pulse groups appearing at input terminal 260, at the upper left-hand part of Fig. 5, are applied to regenerator 261 which removes degradation, both of amplitude and in times of occurrence, which the pulses of the incoming train may have gathered in the course of transmission. The output pulse sequence from this regenerator is applied to serial-to-parallel converter 262 such as a shift register or a tapped delay line. It operates to convert each group of 10 pulses on a single input conductor into 10 simultaneous output voltage conditions appearing on 10 parallel output conductors.

The correct timing of these operations is ensured in the following fashion. A timing recovery circuit 263 which may be conventional is coupled to regenerator 261 by way of loop 264. The output of this unit therefore comprises a wave of fundamental frequency equal to that of the basic digit repetition rate of the incoming pulse train. This timing wave is applied to digit framing unit 265 which may include a divider. The output train of this unit consists of one pulse for each 10 input pulses and therefore consists of a pulse train whose recurrence rate is 64,000 pulses per second. These pulses are applied to talker framing unit 266 which includes a second divider, this time by a factor of 64. Hence, pulses recur on the output conductor of this unit at the rate of 1,000 cycles per second. The uses to which this pulse train is put will be described below.

Of the ten output terminals of shift register 262, the first seven carry the binary digit code representing a particular speech amplitude sample. These are applied, by way of a seven-conductor cable 267 to the seven input segments, such as segment 249, of the seven banks of receive and rewrite code commutator 237. Thus each time the wiper arms of commutator 237 pass this upper set of seven input points they pick off voltages as they appear at the output points of shift register 262 and apply them by way of seven-conductor cable 268 to write circuit 211 shown at the lower part of memory tube 213 which, in turn, applies them to the first seven vertical columns of tube 213. Thus, during the "write" half cycle of the output of square wave read-write generator 232, the seven-digit code is written into memory tube 213; and it is written at a location on mask 212 of memory tube 213 determined by the deflection of the beam of the tube, and hence by the output of position analog decoder 221, which in turn is determined by the output of one of the three counters, namely, distribution counter 222, active hunt counter 241 or busy hunt counter 243, as the case may be, in dependence on that portion of the revolution cycle of commutator 223 in which wiper arm momentarily finds itself.

As in the case of the transmitter apparatus, each time a sample code is read out of memory tube 213, the stored information is automatically erased; but, in order that it may be available for reuse on short notice, it is immediately written in again. To this end, each of the seven banks of receive and rewrite code commutator 237 is provided, in addition to its upper and lower input points, with two segments of greater extent, such as segments 269 and 270 and the individual members of these seven banks are individually connected to the seven output conductors of read circuit 233. Thus, whenever the wiper arm of receive and rewrite code commutator 237 engages ether of these two extended segments 269 and 270, it carries, through cable 268, the sample code data currently being read out of memory tube 213 back into write circuit 211, thus to restore the sample code just read out, and so to nulllify the effect of the erasure.

The eighth and ninth output terminals of shift register 262 which, as explained above in connection with the description of the transmitter apparatus, represent two selected digits corresponding to another speech sample, usually of a different talker, are connected to the sixth and seventh banks of the lower input point, such as segment 248, of receive and rewrite code commutator 237. Thus, one half revolution of commutator 237 after its wiper arm has engaged the upper input point 249, it engages the lower input point 248 and, by way of the sixth and seventh conductors of cable 268, applies signals appearing on the eighth and ninth output terminals of shift register 262 to read circuit 233 of memory tube 213. Thus on the appropriate write portion of the output wave of read-write square wave regenerator 232, the last two digits of some seven-digit code pulse group may be replaced by new ones. Just which group this is depends on the momentary position of the wiper arm of commutator 223 and on the output count of position analog decoder 221 to which it is connected.

At the same time that the wiper arm of commutator 237 engages the lower fixed contact 248 and picks off two new pulses derived from the eighth and ninth output points of shift register 262, it also picks off five old pulses as read out of the first five columns of the same row of memory tube mask 212. The wiper arm combines these seven (five old and two new) pulses together and delivers them as a seven-digit code over the seven-conductor cable to write circuit 211.

The operations of reading out information recorded in memory tube 213 take place exactly as described in connection with the transmitter apparatus and the description will therefore not be repeated. Corresponding elements have the same reference numeral preceded by a 2 instead of a 1 in the hundreds digit.

Delivery of the information stored in memory tube 213 to the telephone subscribers for whom various portions of this information are intended take place in the following fashion: The output terminals of the first seven columns of memory tube 213 are applied by way of seven-conductor cable 271 to the wiper arms of decode commutator 209 which has seven banks. Each time these wiper arms engage one of the smaller output terminals, all of which are connected together (and this occurs four times in each commutator revolution), the code output of memory tube 213 is delivered to the seven input terminals of decoder 272 of the "flash type" e.g., as described in E. W. Adams, Jr., Patent 2,592,228 granted April 8, 1952. Decoder 272 converts them into pulse amplitude samples and delivers them to wiper arm 203 of audio sample distributor 201 which rotates at 8,000 revolutions per second. Hence, provided only that all timing operations have been correctly carried out and that the receiver apparatus is perfectly framed and synchronized with the transmitter apparatus, each of these pulses has the magnitude of the corresponding sample of the voice of the similarly numbered talker.

The tenth pulse of each incoming pulse group, which after conversion from serial to parallel appears on the tenth output point of shift register 262, is applied jointly to the front fixed contacts of active data switch 218 and of busy data switch 219. These two switches are enabled in alternation by the square wave output of compound control wave generator 220 and at a rate equal to one eighth the rate at which the audio sample distributor 201 rotates; that is to say at 1,000 cycles per second. Thus, during four full revolutions of distributor 201, only the active data switch 218 can be enabled, and during the following four full revolutions only busy data switch 219 can be enabled. The transfer of data switches 218 and 219 follows the schedule outlined for the transmitter and occurs only once for each revolution of commutator 209 while the wiper arm is in contact with one of the four smaller segments. The schedule of transfers is controlled by compound control wave generator 220. Correct timing and phasing of the output wave of compound control wave generator 220 is readily secured by application to it on lead 273 of voltages derived from the output terminal of talker data framing unit 266 in the upper part of the figure.

Thus, whatever be the character of the signal arriving at active data switch 218 from the tenth output terminal of shift register 262, namely pulse or space, this signal is passed through active data switch 218 when the latter is enabled by compound control wave generator 220 and not otherwise. The same situation holds for busy data switch 219.

Each such signal which passes through active data switch 218 is delivered by way of conductor 274 to write circuit 211 to be recorded at the proper elevation on mask 212 of memory tube 213 and in its eighth vertical column as an On condition or an Off condition, as the case may be, in dependence on whether this signal is a pulse or a space. Similarly each time busy data switch 219 is operated a pulse or space is applied by way of conductor 275 and write circuit 211 to the ninth column of mask 212 as an On condition or an Off condition. The two conditions thus recorded in the eighth and ninth columns of mask 212, for any particular row, operate, in the fashion described in connection with the transmitter apparatus, to designate the data recorded in the first seven columns of the same row as having been derived from the sample of an active talker, a busy talker, or an idle talker.

However, the idle and busy classification data have by now fully served the purpose for which they were intended in economizing time on the transmission medium and, as a result of the foregoing operations, a seven-digit code representing the amplitude sample of each talker who is active or busy has been recorded on mask 212 of memory tube 213. All seven of these digits are applied in each read-out operation to seven-digit decoder 272, and the resulting full, fine-grained amplitude sample is applied by decoder 272 to wiper arm 203 of distributor 201. It will be noted, however, that for some of the talkers, namely those classified at the transmitter station as busy rather than as active, the seven-digit code thus read out, through decoder 272 into distributor 201 is composed of the first five digits which may not have been altered for several memory intervals, modified and refined by the more recently altered last two digits of this code. For these positions classified as idle at the transmitter the seven-digit code thus read out will normally be the last code recorded for a connected talker.

The square wave read-write generator 232 which controls the timing of the writing operations and the searching and reading operations may be held in synchronism with the framing control apparatus shown at the upper left-hand part of the drawing. One synchronizing control signal path 278 is derived from the output of timing recovery unit 263 and applied through multiplier 276 which increases the pulse rate by two, namely to a pulse rate of 1,280,000 cycles per second, to generator 232. At the same time, the phasing of the common drive for commutators 209, 237, 223 and 236 may be controlled by the output of talker framing unit 266 through variable phase shifter 279 to synchronizing path 277 shown in broken lines.

As has been discussed in the introduction, an elastic speech interpolation system is one which avoids preferential treatment of active talkers by accommodating all active talkers, even at maximum load, by the simple expedient of degrading the transmitted speech of each talker sufficiently to provide the channel capacity for the additional active talkers. Previous elastic speech interpolation systems have accomplished this result by reducing the sampling rate as the number of active talkers increased.

In accordance with the present invention, however, it has been found that even greater economies can be obtained by varying the transmission rate rather than the sampling rate and, furthermore, by transmitting only a sufficient amount of information to efficiently represent the actual signal level of a connected talker rather than transmitting the same amount of information for every talker regardless of his particularly signal level. To this end, information storing means such as for example, beam storage tube 113, has been provided to store the signal samples which are derived at a constant and relatively high sampling rate by audio sample commutator 101. Further, in order to economically represent each signal sample on the transmission medium, control signals are derived by control data commutator 102 which represent the relative signal levels of the different talkers, for example, as described, active, when a talker is actually engaged in making a "speech spurt," busy, when a talker is connected, is not actually talking, but does produce certain background noise which lends realism to a telephone conversation, and idle, when no talker is connected to the line. These control signals are associated with the appropriate signal samples in the information storing medium and are used to control the elastic transmission operation.

Elasticity is obtained by transmitting only those signal samples which correspond to active or busy talkers. Furthermore, the signal samples of active talkers are transmitted with a high degree of fidelity while signal samples of busy talkers are transmitted with much less fidelity because their information content is much lower. Signal samples of idle talkers, of course, are not transmitted at all.

It can be seen that for a given number of active talkers, the signal samples for each talker can be recurrently transmitted at a sufficiently rapid rate to completely represent the original signal. When the number of active talkers exceeds this number, however, samples are transmitted at a lower rate, thus degrading each individual talker's signal but accommodating all of the active talkers regardless of the number.

The elastic transmission rate is secured, in the illustrative embodiment, by conducting successive "hunting" operations in the information storing medium by hunt counters 141 and 143. When the sample of an active talker is found, as indicated by the associated control signals, the hunting operation is stopped and the active talker's sample read out onto a transmission line. The search is then resumed until the sample of a busy talker is found. This sample is read out so as to immediately follow the previously read out active talker's sample and thus form a pair of samples, one active and one busy. The search for another active sample then follows and so on until the entire information storage medium is searched after which the entire process is repeated.

In accordance with the illustrative embodiment of the invention, the signal samples and code signals are stored in the storage medium in the form of binary permutation code groups to permit a more practical instrumentation. The samples of active talkers are transmitted as seven-digit code groups while the samples of busy talkers are transmitted as two-digit code groups. Each pair, comprising a seven-digit active talker code and a two-digit busy talker code has added thereto an additional digit which is used to transmit the activity classification data to the receiver. The two No. 10 digits which follow two sample pairs having like time positions in successive sampler cycles form a two-digit classification code. The classifications of all the talkers are transmitted in regular succession by coding these classifications and transmitting all of the first digits of the codes in the tenth pulse position following each pair of active and busy talker codes and then all of the second digits following each of the next set of pairs. The activity classifications are thus transmitted interleaved between actual signal sample codes. In this way a minimum of channel capacity is used for the transmission of classification information. This lower transmission rate is sufficient because a talker's classification changes at a much lower rate than the actual amplitude of his signal samples.

A detailed block diagram of an elastic speech interpolation system embodying these principles will now be described to illustrate one method by which these various functions can be instrumented.

*Circuit details of transmitter apparatus*

Figs. 10 through 14, when arranged as shown in Fig. 15, show the transmitter apparatus in detail. Figs. 16, 17 and 18 show several waveforms which will be referred to in the explanation of the operation of the detailed transmitting apparatus.

The basic timing wave source may be a crystal-controlled oscillator 301 (Fig. 11), of frequency 1280 kilocycles per second, and hence of period 0.78 microsecond. The output wave of this oscillator is shown as waveform 1 in Fig. 16. This particular frequency was selected for the reason that it provides for a sufficient number of memory control operations for each 3.91 microsecond coding interval with sufficient time for the accomplishment of each one before proceeding to the next one. The output wave of this oscillator is squared up by slicer 302 as shown in waveform 2 of Fig. 16.

The resulting square wave controls, by way of delay line 392 and lead 303, a read operation in read amplifiers 304 on one half cycle (of 0.39 microsecond duration) and a write operation in write amplifiers 305 on the other half cycle (of 0.39 microsecond duration). These two successive operations define a group interval of 0.78 microsecond, i.e., a full period of the timing wave source. This 1280 kilocycle square wave is divided 5:1 by divider 306, which is constructed so as to deliver an output pulse or "mark" for one 0.78 microsecond period of its input wave and a space for the four following full cycles of its input. This output is shown as waveform 4 in Fig. 16. This 5:1 division thus generates the record counter control frequency of 256 kilocycles per second, which is also the audio sampling rate of the pulse code modulation multiplex system, i.e., thirty-two talkers, each sampled 8000 times per second. It is applied to the record counter 307 by way of lead 310, phase splitter 308 and differentiating circuit 407 after a suitable delay in delay line 309. Divider 306 thus constitutes the actualization of one of the functions of counter advance commutator 136 of Fig. 1, namely, the function represented by the connection of every fifth fixed contact to record counter 307. Record counter 307 itself may be a conventional five stage "scale-of-two" counter, each stage of which is a bistable circuit. Two opposite-polarity leads are brought out from each stage as external terminals 311. Similarly, one lead from each stage is brought out as external terminals 393. Thus the "count" is at every moment represented on terminals 311 by a permutation of positive voltages on one set of leads, e.g., the odd-numbered leads, and also by a permutation of negative voltages on the other set, e.g., the even-numbered leads.

As a result of the application of this regular train of control pulses to its input point, record counter 307 advances by one count every 3.91 microsecond, i.e., with full regularity, since the write operations take place without elasticity. On the ten output leads 311 of counter 307 there appear both polarities of a conventional five-digit binary code, the positive polarity on the odd-numbered leads and the negative polarity on the even-numbered leads, and this code changes once every 3.91 microseconds and proceeds systematically through all thirty-two possible combinations. These ten outputs are applied to combining gate 312 whose function is to combine, by means of "AND" gates, some of the digits of the counter 307 output to form pulses which are present only one-fourth of the time instead of one-half as in the counter output. For example, by combining the positive voltages of the least significant digit with the positive voltages of the second least significant digit, a pulse sequence is formed in which the pulses have the duration of the least significant digit but the period of the second least significant digit. Similarly, by combining the negative voltages of the least significant digit with the positive voltages of the second least significant digit, a similar pulse sequence can be formed which is delayed in time by one pulse position. The relationship between some of the various pulse sequences formed by combining gate 312 is shown in waveforms 39 through 42 of Fig. 19 and is such that commutating action can be obtained by connection to only three of its output leads. This is possible because the time selectivity of each output lead, except that of the last digit, has been increased by a factor of two, i.e., one out of four possible time positions instead of one out of two. This arrangement permits fewer control connections to be made to the commutating gates. Some of the outputs serve to control secondary gating functions to be described later, but their principal function is to control the information collection commutating operation.

The diagram shows the circuit equivalent of two information commutators, schematically represented in Fig. 1 as audio sample commutator 101 and control data commutator 102. The appropriate outputs of combining gate 312 are connected to the speed amplitude samplers, such as audio sampler 313, and, through the audio samplers, to the speech detector samplers, such as speech detector sampler 317, at each of the talker positions 321, 322 and 323. The contents of talker position 321 are shown in detail. The sequentially operated audio samplers, with their controls, comprise audio sample commutator 102 of Fig. 1 which serves to derive amplitude samples from the thirty-two talkers in succession and to arrange them in time as a PAM multiplex sample train, without regard to whether any talker is active, busy, or idle. The PAM sample train is transferred to PAM bus 325 by the systematic closure of the audio sampler gates such as audio sampler 313. Each of these samples is converted into seven-digit binary code by the flash coder 326 and the resulting seven-digit output appears on separate leads ready to be stored, by way of line 401, in memory 341.

The sequentially operated speech detector samplers, such as sampler 317, with their controls, comprise the control data commutator 102 of Fig. 1. As with control data commutator 102 of Fig. 1, it is the function of these samplers to make available, as a time-separation-multiplex signal train, data indicating whether or not a talker is actually connected to the input circuit and whether or not that talker is actually generating a talkspurt. When a telephone, including a handset such as handset 327, is connected to a talker position, the back contact 328 of a toll board jack 329, or any equivalent relay, is utilized to inject a direct current bias into the output path of a differential speech detector such as detector 330 which holds the signal level in this path sufficiently high to permit operating a common busy level slicer 331, connected to the control pattern bus 394, no matter what the actual state of the voltage output of differential speech detector 330. This biased condition is utilized to represent the "1" for busy control data. When a telephone is not connected into the talker position, this direct current bias is removed by grounding back contact 328, and the output voltage of speech detector 330 drops to a level which is never sufficient to operate busy level slicer 331 even though the magnitude of the signal is being varied by the action of differential speech detector 330. Thus, connection of a subscriber's telephone to the system, in effect, provides a pedestal voltage indicating its busy classification, and disconnection of the telephone removes the pedestal.

The active data signal is superimposed on this pedestal. The active data is more than simple off-on voltage, however. In order to prevent false loading due to transhybrid cross-talk, it is advantageous to provide some type of level difference recognition. A suitable circuit is shown in block form as differential speech detector 330 attached to one input position of speech detector sampler 317. One such differential speech detector or some similar device is required for each input position. Briefly, its function is to compare the level of the outgoing transmitted speech signal from handset 327 with the level of the incoming received speech signal on line 395, as these two signals appear in hybrid 332 after suitable speech-band preemphasis filtering in circuits 396 and 397, respectively. The envelopes of the two signals are applied to difference amplifier 333 whose output polarity and amplitude are proportional to the speech levels at hybrid 332. If (a) the received speech level is greater than the transmitted speech level (taking into account a normal hybrid loss and a normal input-output level change) or if (b) neither the incoming nor the outgoing signal contains any appreciable speech energy, the output signal of the difference amplifier is not sufficient to operate active level slicer 334, despite the busy bias pedestal voltage which may be supplied by way of contact 328. If (c) the transmitted speech of a particular talker does contain sufficient energy, as compared with the incoming signal destined for him, and if (d) the "busy bias" pedestal is present, the output of differential amplifier 333 operates active level slicer 334 when a sample of the speech of that talker is taken. The input to busy level slicer 331 and active level slicer 334 is therefore a sequence of thirty-two PAM samples, the level of each of which is a combination of the relative speech energy at hybrid 332 superimposed on a pedestal if the talker momentarily being sampled is busy and no pedestal if he is not busy.

Busy level slicer 331 operates for each talker position in which a pedestal appears. The output of busy level slicer 331 is connected by way of lead 423, to storage tube writing circuit 305 through the bottom pole 398 of busy entry switch 335. Normally switch 335 is in the position shown, and the busy level data is not used. During those recording intervals when a busy control digit can be sent to the receiver, however, switch 335 is operated so that the busy pulse or space can be written into memory tube 341 in place of whatever signal is already recorded. At the same time that this local recording takes place, the second pole 336 of busy entry switch 335 transfers the same information to the transmission output circuit 399 via lead 424, resample and hold circuit 337 and send control data switch 338 so that it can be sent to the receiver for recording there.

Active level slicer 334 determines whether the level of the input speech is above or below a threshold "active" reference value. If the energy of a particular talker's speech is above this threshold, a pulse is produced at the output of slicer 334, and if it is not, a space is produced at the output. Thus the talker levels are converted to a sequence of simple off-on pulses.

Some hangover is preferably provided at the end of each talkspurt in order to provide time for the low speech energy sounds to decay naturally at the end of a talkspurt. It has been determined that about 100 milliseconds of hangover are desirable, and that some advantages may be gained by making the hangover duration longer for the low level talkspurts. Among other instrumentalities, a special memory may be employed to provide the hangover. It is indicated in the block diagram as a thirty-two bit hangover memory tube 339. Tube 339 may include an electrostatic deflection system that operates to position a writing and reading beam. The actual positioning voltages can be obtained from an analog decoder operated by the output of record counter 307 in the same fashion as that to be described for position analog decoder 346. Indeed, the same decoder could be used if the beam were enabled only during the interval when record counter 307 is in control. Normally the beam intensity is adjusted to the writing level; this is sufficient to cause a pulse to be stored the first time it appears at the output of active level slicer 334 for a given talker position. Subsequent pulses serve merely to restore any charge which is removed during the reading operation. When a space is present on the input, the stored charge remains unchanged.

During those parts of the one millisecond control data frame when activity data is wanted as indicated by an enabling pulse on line 402 to read out circuit 403, tube 339 is switched to the reading condition and the beam intensity is adjusted to a level such that it will take about 100 readouts at a given position to remove or erase so much charge that the output level will be insufficient to operate activity pattern slicer 340. Since the active-busy-idle classification of each talker's speech is sampled just once in each millisecond, the output level of tube 339 will indicate that talker as active until at least 100 milliseconds have passed without the appearance of an input pulse. The output of activity pattern slicer 340 constiutes the data which is written locally into storage tube 341 and which is simultaneously transmitted to the receiver for storage there. This data is therefore applied to active entry switch 342 by way of lead 404 and is gated by the lower pole 425 of switch 342 into write amplifier 305 of memory tube 341. If this bit of control data appears as a pulse for a given talker position during succeeding active hunt intervals the entire seven-digit code counterpart of that talker's most recently recorded speech sample is transmitted to the receiver station.

The speech and activity classification commutating operations permit three kinds of data to be determined about the input talker signal. They are (1) the actual amplitude of that signal, translated by coder 326 into a seven-digit code, (2) an indication of whether or not the signal is being generated in a circuit which is actually in use or is simply an idle trunk, as indicated by the output of busy level slicer 331, and (3) an indication of whether or not the signal is from a talker with sufficient speech energy to be classified as generating a talkspurt, as indicated by the output of active level slicer 334. All three kinds of control data are ultimately expressed as a sequence of on-or-off pulses. It is now necessary to make use of this data in a manner which will permit the transmission of good quality speech over a transmission circuit capable of handling substantially fewer digits per second than would be required to transmit the signal samples of all thirty-two voice circuits by ordinary PCM multiplex techniques.

*Counter timing control*

The discussion of the simplified diagram of Figs. 1 through 3, and particularly of the control exercised by commutators 109, 137, 123 and 136, brought out the sequence of operations which must be performed. The present section is concerned with the instrumentation of these commutators with conventional electronic circuitry.

Waveform 3 in Fig. 16 shows a differentiated and clipped leading edge of waveform 2 formed by introducing waveform 2, by lead 405, to differentiator 406, used to trigger the two hunting counters 343 and 344 after suitable sorting in busy and active stop gates 367 and 355. Waveform 4 of Fig. 16 shows the output of divider 306 which is used to determine the times when a recording operation should take place. As mentioned earlier, divider 306 is constructed to produce a pulse for one 0.78 microsecond interval of each group of five such intervals and a space for the other four intervals. The pulses from divider 306 are used to operate switch 345. This will close switch 345 at uniform intervals, and thus cause the binary code being generated by record counter 307 to be switched to the input of position analog decoder 346. As soon as the recording operation is complete, switch 345 opens. The differentiated and clipped trailing edge of waveform 4 in Fig. 16 is shown as waveform 6, and consists of a sequence of spikes generated in differentiator 407. These spikes are applied to record counter 307 and cause it to advance in its count by one number after each of the recording operations so that a new talker position in memory tube 341 can be sampled.

The first stage of record counter 307 generates a pair of opposite-polarity waveforms such as shown at 7 and 8 in Fig. 16. Waveform 7 is the output of the even-numbered side of the first stage of record counter 307 and produces a positive pulse when the first digit of the binary code output count is "0," and waveform 8 is the output of the odd-numbered side of the first stage of record counter 307 and produces a positive pulse when the first digit is "1." Waveform 7 is positive for five cycles of the original timing wave and negative for the next five cycles while waveform 8 is the inverse. As in conventional binary counter practice, the output of the even-numbered side of the first stage of record counter 307 is differentiated as shown in waveform 9 of Fig. 16 and used to trigger the second stage which traces out the waveforms shown as 10 and 11, in Fig. 16. Waveform 10 is that of digit two equal to "0," and is positive for ten cycles of original square wave 2. Inverse waveform 11 is positive for the next ten cycles; so these two waveforms serve to divide the total interval of 125 microseconds into the active hunt interval and the busy hunt interval.

It will be recalled that the output of active hunt counter 344 is connected to the input of position analog decoder 346 during all of the active hunt interval except for those two memory intervals which are allotted to the operations of writing new data, and during which the output of record counter 307 is connected to position analog decoder 346. The waveform to control switch 347, which connects active hunt counter 344 to decoder 346, is obtained by applying waveforms 4, obtained from waveform 5 on lead 310 by inversion in phase splitter 308, and waveform 11 of Fig. 16 to active hunt interval gate 348. This is a simple "AND" gate which requires that both input waveforms be negative before a negative output can be obtained. The resulting waveform is shown as 12 in Fig. 16. It is applied to switch 347 by way of lead 425 and causes it to pass the binary code from active hunt counter 344 to decoder 346 at the proper times.

Waveform 13 of Fig. 16 is derived in a similar manner by applying waveforms 10 and 4 to busy hunt interval gate 349. When this waveform is negative it transfers gate 350 via lead 426 so that the output of busy hunt counter 343 is connected to position analog decoder 346 for the proper intervals. The desired sequence of counter connections is obtained by the combined switching actions due to waveforms 5, 12, and 13 of Fig. 16. The input to decoder 346 then represents, in coded form, the positions to which the beam is required to be moved in order to carry out an orderly hunting and recording routine. The next operation is to reduce this coded data to a voltage suitable for positioning the beam.

*Position analog decoder*

Position analog decoder 346 is merely a simple PCM decoder of the flash type. Digit storage capacitors 408 are used at the input to decoder 346 in order to bridge over the gaps between closures of the switches. In a working circuit, and as a refinement, provision may be made for closure of the switches 345, 347 and 350 only momentarily once in each interval. This storage operation permits a smooth transition from one code to the next by disconnecting counters 343 and 344 during times in which they might be producing false codes in advancing a count. An example of the output of position analog decoder 346 appearing on output lead 427 is shown as waveform 16 in Figs. 16 and 18.

This decoded output is amplified by amplifier 352 and applied to vertical deflection plates 351 of storage tube 341 by way of leads 428 to position the ribbon beam at the specified location.

*Storage tube*

A suitable storage tube such as might be satisfactory for an application of this type is shown in Fig. 9 and has been discussed above. This tube is similar to an ordinary barrier grid storage tube except that it uses a ribbon beam and multiple input and output circuits. A tube of this type would permit all of the digits to be handled in parallel in one tube. As previously described, the read and write conditions are established by biasing the back plate to the read condition during the first half of square wave 2 of Fig. 16 and biasing it to the write condition during the second half of the wave. These operations will be described in the following section.

*Read and rewrite cycle*

The parallel output code word from tube 341, which comprises seven digits for the amplitude sample and two digits for the activity classification data, is first amplified and regenerated in time and amplitude by read amplifier 304. Read-out switch 353 is operated by waveforms 17 and 18 of Fig. 17 appearing on lead 429, generated from the basic waveform 1 in Fig. 16 by pulse shaper 409, to gate out and stretch a narrow section of the pulses. The read-out codes are thus made available for the entire memory interval. The sample amplitude code is normally fed back to write circuit 305 through write entry switch 354 and the control data code through busy and active entry switches 335 and 342. Having been read out of the memory tube 341 during the first half of any memory interval, these codes are written back into the memory tube 341 during the second half of the memory interval in the same place they occupied before. Correct location of the rewrite is ensured by the fact that the beam position cannot change until both a read and a write operation are completed. Write entry switch 354 is operated from its normal position during every fifth memory interval by waveform 4 on lead 410. When write entry switch 354 is operated, the newly generated PCM code from coder 326 is substituted in the memory in place of the code which had been read out during the first half of the interval. Switch 335 or 342 is operated once for every four operations of write entry switch 354 and at the same time as one of the four operations of switch 354 so that a single new control pulse or space is substituted in the memory for the one which had been there. The same information is gated into resample and hold circuit 337 by way of the top poles 336 and 430 of switches 335 and 342 at the same time it is gated into memory tube 341 by the bottom poles 398 and 425. It is taken out of resample and hold circuit 337 at the appropriate time for transmission of the control digit by the operation of send control data switch 338.

The description of the apparatus for determining just when busy and active entry switches 335 and 342 shall be closed will be deferred. The problem is merely one of interlace waveform generation. More pertinent to the elastic features of the present system is the use of the control data to stop the advances of the counters at the proper times.

Hunt operation control

The first requirement is to generate a waveform suitable for triggering the hunt counters 343 and 344 in each of four successive intervals, pausing for one memory interval for a recording operation, and then triggering the counters in each of four more successive intervals. After the second group of four, the counter, which has just been conducting a hunt operation, must wait for eleven memory intervals to permit the other counter to conduct its hunt operation and to allow for three recording operations. The active hunt counter 344 triggering pips are shown as waveform 14 in Fig. 16. This waveform is obtained by combining waveform 3 and waveform 12 in active stop gate 355.

Active stop gate circuit

Active stop gate 355 is shown in detail. A negative going "AND gate," which produces waveform 14 of Fig. 16, is made up of varistors 356 and 357 and resistor 358. The junction of these three elements can go negative only when both waveform 3 from differentiator 406 and waveform 12 on lead 425 from active hunt interval gate 348 are negative. Varistors 359 and 360 further restrict the operation of this "AND gate," making it necessary that the inputs to both of these varistors also be negative before a trigger pip can be gated through to active hunt counter 344. The waveform applied to varistor 359 on lead 416 from identification group single-trip multivibrator 382 goes positive only for one group interval every few milliseconds when a framing check operation is to take place as will be described below. It may therefore be ignored for the present. The input to varistor 360 is the combined output of a negative going "OR gate" comprising varistors 361 and 362 and resistor 363. The common junction of these three elements is held negative either when the active control digit on lead 431 and via phase splitter 371 is a space (plus phase lead 432) or when waveform 24 Fig. 17 on lead 433 from active unblock pulse gate 365 is negative. Resistors 363 and 358 are so proportioned that resistor 363 can pass sufficient current through varistor 360 to inhibit the negative going "AND gate" (varistors 356 and 357) unless the input to one of the varistors 361 or 362 is negative. The waveform on lead 433 applied to varistor 362 is, as shown by waveform 24 of Fig. 17, normally positive so that when the input on lead 432 to varistor 361 appears as a positive pulse due to the beam of memory tube 341 having arrived at the position of an active talker, the triggering pulse to active hunt counter 344 is blocked and the count comes to a stop. The outputs of the five stages of active hunt counter 344 are shown as waveforms 45, 46, 47, 48, and 49 in Fig. 18. Waveform 45 is derived from waveform 14 by a counter stage which changes state for each input pulse. Waveform 46 is similarly derived from waveform 45, waveform 47 is similarly derived from waveform 46, and so forth.

Active hunt

When switch 347 is closed, during the negative sections of waveform 12 of Fig. 16 appearing on lead 425, active hunt counter 344 has control of the position of the beam in memory tube 341. In the process of reading out and rewriting each of the words as the beam steps along, the active control digit on lead 431 from tube 341, by way of phase splitter 371, is made available for control of active stop gate 355 on lead 432. This output on lead 431 is shown as waveform 43 in Fig. 18. When this control digit is a space, active stop gate 355 follows its normal pattern, producing the pips of waveform 14 in order. When the control digit is a pulse, due to the fact that the beam, in its advance, has come to a position at which the speech sample of an active talker is stored, active stop gate 355 is inhibited by a pulse on lead 432 so the following pips of waveform 14 are blocked and cannot get through to trigger active hunt counter 344. This sequence is shown in Fig. 18 which repeats waveforms 14, 15, and 16 with many more intervals. As a result, active hunt counter 344 remains at the same count and holds the beam of storage tube 341 at the same place.

During the remainder of the memory intervals, if any, in this hunting operation, the same word is again read out of memory tube 341 and rewritten back into it. As a result, the active control pulse continues to appear at lead 432 to active stop gate 355 and prevents the count from continuing. Continuation of the active hunt is postponed until the last memory interval of a group of ten, at which time the full seven digit code derived from the storage mask position where the beam is stopped is gated into output circuit 399.

The waveform to control the active talked PCM switch 364 is obtained by combining three waveforms. Two of these 8 and 10 from Fig. 16 are already combined in combining gate 312 to produce a pulse only during that one fourth of each digit group interval when the first digit of record counter 307 is a "1" and the second digit is a "0." This wave, on lead 411, is combined with the undelayed version of waveform 4 on lead 310 in an "AND gate" designated active unblock pulse gate 365. The resultant is shown as waveform 23 in Fig. 17. A phase splitter is included in active unblock gate 365 to invert this wave, so that its pulses shall be available in both polarities on leads 412 and 433. The inverted version is shown as waveform 24 of Fig. 17.

Waveform 23, appearing on lead 412, transfers active talker PCM switch 364 by way of pole 435 of identify now switch 376 for one interval out of each twenty memory intervals, and hence gates the parallel PCM code into output circuit 399 after being converted to a series code by a simple delay line distributor 366.

It is to be noted that a code is transmitted at the end of each active hunt operation whether or not an active talker was found in the course of the active hunt. If no active talker has been found, the circuit merely treats the talker position at which the beam is stopped as that of an active talker and sends his code. This code group will be substituted, in the receiving storage tube, for whatever code had been used; so the infrequent occasions when a non-active talker code is transmitted serve to keep the D.-C. levels of the idle talkers up to date. The length of a hunt cycle is chosen such as to find an active talker most of the time when the loading is heavy enough to reduce the sampling rate below the nominal value of 8,000 times per second.

At the end of the active hunt interval, a trigger pulse is gated through to active hunt counter 344 to advance it by one count. This prevents the beam of tube 341 from being located on the same talker position of the memory tube mask during the next period. Waveform 24 of Fig. 17, appearing on lead 433 from active unblock gate 365, is applied to varistor 362 of active stop gate 355 to bring about this result. The negative pulse pulls the "OR" section (varistors 359 and 360) of active stop gate 355 negative, and thus prevents varistor 360 from blocking the eighth trigger pip of waveform 14. Therefore, the final trigger pip gets through to the active hunt counter 344 despite application of the active talker pulse to varistor 361. This trigger pip advances counter 344 to the output code condition that it is to hold during the busy hunt operation which follows.

*Busy hunt*

Another group of waveforms are applied to busy stop gate 367 to control busy hunt counter 343 by a similar procedure. In this case, however, an additional control pulse must be applied to prevent counter 343 from being stopped when an active talker position is encountered. Since, for each active talker, a pulse is stored in both the busy and the active digit positions; i.e., in both the eighth and the ninth columns of the mask of tube 341, busy stop gate 367 would operate via a pulse on lead 436 to varistor 437, on both the active and the busy talker positions. The memory tube output on lead 436 is shown as waveform 44 in Fig. 18. To prevent this, an additional varistor 368 is connected to the common junction of the "OR gate" section (varistors 369 and 370) of busy stop gate 367. The active control digit is inverted in phase splitter 371 and applied to varistor 368 by way of lead 438. Phase splitter 371 converts the active pulses to negative polarity pulses on lead 438 which hold the "OR" section (varistors 437 and 439) negative whenever an active talker is encountered. This "OR" section cannot then prevent the trigger pips from reaching busy hunt counter 343. When the active digit is a space, varistor 368 is held positive; so it has no effect on the operation of gate 367.

The busy hunt counter trigger pips are obtained by combining waveforms 3 from differentiator 406 and waveform 13 of Fig. 16 on lead 426 from busy hunt interval gate 349 in the "AND" section (varistors 372 and 373) of busy stop gate 367. These trigger pips are shown as waveform 15 of Fig. 16.

At the conclusion of each busy hunt operation, the last two digits of the sample amplitude code for the indicated talker are to be gated into output circuit 399. This gating operation is controlled by waveform 21 of Fig. 17 which is obtained by combining the undelayed version of waveform 4) appearing on lead 310, with the one-fourth On, three-fourths Off, square wave which appears on lead 439 and is obtained in combining gate 312 by combining the "1's" state of the first and second digits of the output of record counter 307. Waveform 21 of Fig. 17 therefore appears at the output of busy unblock pulse gate 374. It is used, on lead 413, to operate busy talker PCM switch 375 (via pole 440 of identify now switch 376) and to operate send control data switch 338. Switch 375 gates two digits of the sample amplitude code stored in tube 341 into the appropriate delay line taps of distributor 366 for distribution into output circuit 399. Waveform 22, the inverted version of waveform 21, is used on lead 414 to enable busy stop gate 367 and thus unblock busy hunt counter 343 at the conclusion of the hunting operation and to advance it to the count at which a new busy hunt will be commenced after the next active hunt operation.

The required sequence derived from delay line distributor 366 for output circuit 399 is shown in waveforms 25 through 35 of Fig. 17. Waveforms 25 through 31 show the sequence of the seven active talker code digit positions; waveforms 32 and 33 show the two busy talker code digit positions; and waveform 34 represents the control digit position. The combination of these digits, after suitable stretching, is shown in waveform 35.

The two hunting operations continue to alternate, one after the other, with time taken out at uniform intervals to record new data as it appears and to send it to the receiver by the operation of send control data switch 338. As far as the transmitter is concerned, this is all that is required to obtain the desired elastic multiplex operation. The receiver, however, will need some form of framing information in order to permit it to carry on the demultiplexing operations in synchronism with the transmitter and this information must be generated at the transmitter. The generation of such signals is discussed below.

*Synchronizing and framing signals*

Several types of information are required for the proper timing of the operations at the receiver. The first is the frequency of the digits as they arrive at the receiver over the transmission line. This can be obtained by following any of the conventional PCM practices such as squaring up the received pulses and using pips derived from them to shock-excite a narrow band filter. For the sake of simplicity of explanation, the framing operations for a ten-digit group frame and for a control data frame are combined and obtained in a well-known manner.

Figure 19:
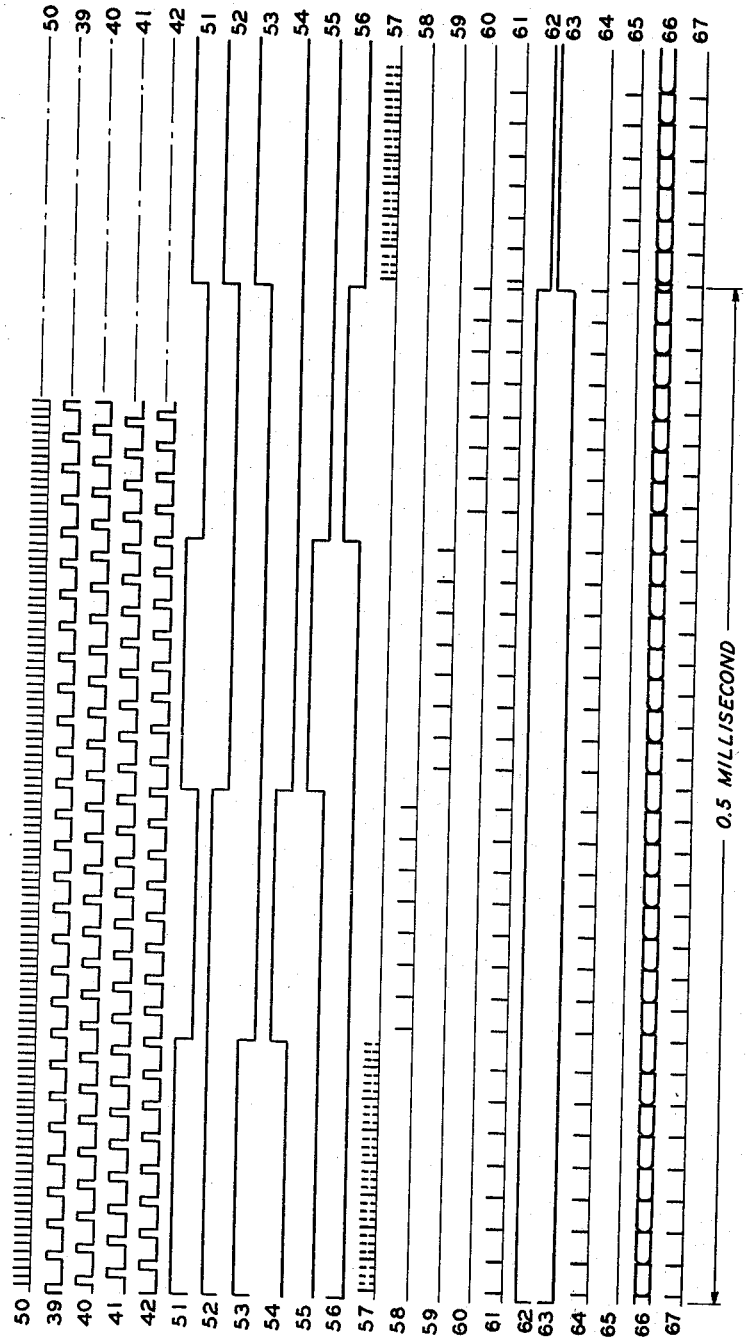

At the transmitter, the control data frame is established by subdividing the repetition rate of the last digit pulse output of record counter 307, shown as waveform 50 in Fig. 19: (*a*) in the ratio 4:1 in quarter group selection counter 377, appearing on lead 441, and (*b*) by an additional factor 2:1 in pattern selection counter 378, appearing on lead 442 and shown as waveforms 62 and 63 in Fig. 19. This adds up to a total subdivision of 8:1; so the 8000 frames per second of record counter 307 are reduced to 1000 frames per second for the control data. If supervisory and checking data were to be transmitted in addition to the active and busy control data, the frame rate could be further reduced to 500 cycles per second.

Pattern selection counter 378 produces a 1000 cycle square wave, shown as waveform 62 which is on for 0.5 millisecond and off for 0.5 millisecond. This establishes a one millisecond control data frame. Each time pattern selection counter 378 completes a cycle, it triggers framing interval single-trip multivibrator (STMV) 379 which, through delay 415, triggers framing divider 380 from the trailing edge of its pulse. While framing interval STMV 379 is On, it transfers framing switch 381. Framing switch 381 gates the then present state of framing divider 380 to output circuit 399 instead of the least significant digit of the active talker code which would otherwise be sent at that time. Since framing divider 380 reverses once for each such operation, this one-digit position, which recurs once each millisecond, will be constituted of a pulse that is alternately present and absent. This condition can be readily recognized at the receiver in the fashion and by the apparatus described in the Bell System Technical Journal for January 1948, pages 1 and 44. Once the correct frame condition has been achieved, it can be locked onto in such a manner that it will take several false digits to "jar" the control circuits loose into the digit hunting condition. The conscripted digit will normally be taken at random from all of the talkers; so its use produces no ill effects except an occasional slight increase in the quantizing noise. Once this particular digit has been framed on, every individual digit position of the transmitted pulse sequence is known and assignable. So, too, are the identification control data which arrive in a fixed order.

The next operation which must be performed is to provide the framing signals for the active and busy hunt counters at the receiver. To this end a counter position identification code of ten digits is transmitted at intervals of two milliseconds. One such transmitted group of ten digits serves to identify the positions of the two counters; so the hunting operations are delayed while the identification codes are being transmitted. This is accomplished by arranging for framing divider 380 to trigger identification group single-trip multivibrator (STMV) 382. Single-trip multivibrator 382 delivers a pulse one ten-digit group interval long which is applied to both busy stop gate 367 and active stop gate 355 by way of lead 416. Once in every two milliseconds, one such pulse drives varistors 364 and 359 in each of these gates positive to prevent any of the trigger pips from getting through to counters 343 and 344. As a result, neither of the two counters can advance; so each counter remains at the count at which it stopped during the previous hunt.

At the same time identification group STMV 382 is blocking the count, it also operates identify now switch 376. This transfers pole 435 to gate the control pulses on lead 412, which normally operate active talker PCM switch 364, to send identification switch 385. This causes the five-digit codes from busy hunt counter 343 by way of lead 417 and active hunt counter 344 by way of lead 418 to be gated, via delay distributor 419, into output circuit 399 in place of a regular ten-digit group. Pole 440 of identify now switch 376 opens at the same time and prevents the two-digit busy code from being gated into the outgoing line by busy talker switch 375 as well as the single control data digit which would normally have been sent through send control data switch 338.

As soon as the identification of the two counter positions has been sent to the receiver, identification group STMV 382 returns to its normal condition and the hunting operations can proceed for another two milliseconds. If the transmission of counter framing control signals as frequently as once every two milliseconds is unnecessary, more stages of stepdown can be employed. It is not profitable to correct the counter framing more often than once every control data frame, for the reason that an error in the receipt of one bit of this data cannot be corrected until after the completion of one full frame.

The manner in which such a framing identification code can be utilized at the receiver is plain. The instant at which it is due to reach the receiver is known from the timing and the Off or On condition of the control data framing digit. When the proper time arrives, the identification codes can be gated out of the transmission circuit to force the receiving terminal counters to the code conditions indicated. The progressive advances of the receiving counters are postponed for this one frame just as were those at the transmitter; so, normally, each apparatus component is in the right condition, and no change takes place. Within two milliseconds after the occurrence of an error, the erring counter is reset to the right condition and all subsequent operations proceed correctly as long as the control information stored in the receiving memory is the same as that stored in the transmitter memory.

*ESI receiving multiplex*

The framing requirements for the receiver were discussed in the previous section. The conversion from the elastic multiplex on the transmission line back to a regular decoding an distributing sequence requires an operation which is almost identical to that of the transmitter. Hence a brief description will suffice. As each of the successive ten-digit code groups arrives, it is broken down into its component parts. The seven-digit amplitude sample code is converted from its sequential form to the simultaneous form by a shift register. It is written into that position at which the storage tube beam stops at the end of the active hunt interval. The two-digit busy code is written into the appropriate two digit locations at that place in the memory at which the beam is stopped at the end of the busy hunt operation. The single bit of control data is routed to its proper spot during the equivalent of the record interval time. In the receiver, the record interval counter becomes a read interval counter. At 3.91 microsecond intervals, the beam of the memory tube is deflected to each of the talker positions in sequence; so the full seven-digit code stored at each such position can be read out and sent to the decoder. This same code is rewritten into the memory during the next half cycle of operation; so that a full code record is always available for the decoder. The distribution is controlled by the read interval counter, whose construction and operation may be identical with those of record counter 307 and which opens one gate after another as it proceeds through its count. Since the control data are sent to the receiver, there is no need for any control data commutator or its associated apparatus.

*Control data selection*

The discussion of the control data selection procedure was omitted from the description of the transmitter apparatus in order that the more direct description might be continued without interruption. This procedure, which is the same for the receiver as for the transmitter, is given in this section.

Although four newly generated PCM codes are to be recorded during each group interval, only one bit of control data from one of the four of these talkers can be accommodated by the transmission line in any one group; so the one bit to be sent and recorded locally must be selected by an auxiliary group of waveforms. As a matter of convenience, both the active control data and the busy control data for each of the talkers are made available at each of the four times when a recording operation is to take place. The selection of one bit of data out of eight is controlled by two counters. Quarter group selection counter 377 is a simple two-stage counter having, in operation, four possible combinations of the two states of each stage. The outputs of the two counter stages of quarter group selection counter 377 are shown as waveforms 51 and 52 in Fig. 19. The four waves obtainable by combining these four waves in combining gate 386, similar to combining gate 312, are shown as waveforms 53, 54, 55, and 56 in Fig. 19. Because the control data selection is to be limited to those intervals when a recording operation is taking place, these pulses are further shortened by a shortening control of combining gate 386. Waveform 3, Fig. 16, is used to reduce each of the four waves to a train such as that shown as waveform 57 in Fig. 19, corresponding to waveform 53, in which narrow pulses would be present at dotted positions as well as at the solid ones. The pulses within each of the groups are still separated by only 3.91 microseconds; so all control codes would still be recorded.

The next operation is to combine these four waveforms in quarter group mixer 387 with the set of four waves obtained by combining the first two digits of the record counter 307 output in combining gate 386. For an example of these waveforms, see waveforms 68, 69, 70, and 71 in Fig. 18. One of each of the two groups of waveforms is combined in a simple "AND gate," such as the "AND gate" comprising diodes 420, 421 and 422, which causes three out of every four pulses from combining gate 386 to be omitted. This leaves the solid pulses of waveform 57 for the first group and corresponding pulses for the other groups shown as waveforms 58, 59, and 60 of Fig. 19. The outputs of each of these four "AND gates" are then multiplexed onto a common bus 388 and fed to a cathode follower 389. The resulting wave is shown as waveform 61 in Fig. 19.

During the first complete count of record counter 307, pulses appear at the times the speech samples of talkers 0, 4, 8, 12, et cetera are being coded and stored. During the next complete count the pulses appear at the times talkers 1, 5, 9, 13, et cetera are being coded. The pulses during the third complete count appear at the times talkers 2, 6, 10, 14, et cetera are being coded. The remaining talkers, Nos. 3, 7, 11, 15, et cetera are coded during the fourth complete count. Once the pulse selection has been broken down to one talker out of each group of four, it is merely necessary to permit the pulses first to operate busy entry switch 335 and then to operate active entry switch 342. This sorting is accomplished by another divider stage, pattern selection counter 378, which is triggered by the output of quarter group selection counter 377. Busy interval gate 390 is a simple "AND gate" which is enabled to pass the output pulses from quarter group mixer 387 through to busy entry switch 335 during one half cycle of the square wave produced by pattern selection counter 378 as shown by waveform 65 in Fig. 19. Similarly, active interval gate 391 is enabled to pass the output pulses from mixer 387 through to active entry switch 342 during the other half cycle as shown by waveform 64 in Fig. 19. Thus, the closures of these two switches alternate in the desired manner to permit the appropriate bit of data to be stored by resample-and-hold circuit 337. The control pulse or space, shown as waveform 66 in Fig. 19, is read out of resample-and-hold circuit 337 at a uniform rate by the operation of send control data switch 338, which is in turn operated by the output of busy unblock pulse gate 374. Thus the storage operation in resample-and-hold circuit 337 brings the successive items of the control data to times where they can be gated into the transmission circuit regularly by waveform 67 of Fig. 19 which is a compressed version of waveform 21 of Fig. 17.

It is understood that the above-described arrangements are simply illustrative of one of many possible specific embodiments which can represent application of the principles of the invention. Numerous and varied other arrangements can readily be devised in accordance with these principles by those skilled in the art without departing from the spirit and scope of the invention.

What is claimed is:

1. In a time division multiplex transmission system, a plurality of incoming signal channels, means for sampling said channels in rotation to determine, for each channel, the instantaneous amplitude of the signal carried by said channel, means for classifying each of said instantaneous amplitudes in one of three different ranges of activity, means for converting the amplitude and the classification of each signal into permutation code groups of signalling conditions, a storage device, means for sequentially writing said code groups for the several channels into said device, means for scanning the classification code groups thus stored in said device to determine the activity classification of the corresponding signal amplitude code group, means for sequentially reading out of said device the entire amplitude code groups of those channels thus determined to be in a first range of activity, means for transmitting said entire active channel code groups in first portions of successive time intervals, means for sequentially reading out of said device only selected significant parts of code groups of those channels thus determined to be in a second range of activity, means for transmitting said code group parts in second portions of said successive time intervals, means for transmitting said channel classification code groups in third portions of said successive time intervals, and means for skipping the amplitude code groups of those channels thus determined to be in a third range of activity.

2. In a time division multiplex transmission system, a plurality of incoming signal channels, means for sampling said channels in rotation to determine, for each channel, the instantaneous amplitude of the signal carried by said channel and a datum specifying the classification of each said channels as active, busy or idle, a storage device, means for sequentially writing the sample amplitudes and the classification data for the several channels into said device, means for scanning the classification data thus stored in said device to identify active channels, means for sequentially reading out of said device the amplitude samples of active channels, means for transmitting said active channel samples in first portions of successive time intervals, means for sequentially reading out of said device only parts of the amplitude samples of busy channels, means for transmitting said busy channel amplitude sample parts in second portions of said successive time intervals, and means for transmitting channel classification signals in third portions of said successive time intervals.

3. In a time division multiplex transmission system, a plurality of signal sources, means for sampling said sources in rotation to determine, for each source, a first datum specifying the instantaneous amplitude of the signal from said source and a second datum specifying its activity classification, a storage device, means for sequentially writing said data for the several sources into said device, means for scanning the classification data thus written in said device to identify the ones of said sources specified as active by said second data, means for sequentially reading out of said device the amplitude data of said active sources, means for transmitting said active source data in first portions of successive time intervals, and means for transmitting activity classification data in second portions of successive time intervals.

4. In a time division multiplex transmission system, a plurality of signal sources, means for recurrently deriving signal samples from each of said signal sources in succession, means for encoding each of said signal samples into a permutation code group having a given number of digits, means for determining the energy content of each of said signal samples, means for transmitting the ones of said code groups corresponding to each of said signal samples having an energy content exceeding a first predetermined level, and means for transmitting significant digits less than said given number of digits of the ones of said code groups corresponding to each of said signal samples having an energy content exceeding a second predetermined level but not exceeding said first predetermined level.

5. In a time division multiplex transmission system, a plurality of incoming signal channels, means for deriving activity classification data classifying the signal momentarily occupying each channel as active, busy, or idle, means for converting each active signal amplitude into a wide-range code pulse group, means for converting each busy signal amplitude into a narrow-range code pulse group, means for transmitting one such wide-range group and one such narrow-range group as a pair, and means for transmitting said activity classification data in combination with said group pair.

6. In combination with a plurality N of outgoing lines and an incoming time division multiplex channel carrying successive code pulse group pairs; one member of each such pair being a group of $n$ pulses representing the amplitude of a sample of the speech of a talker of a first class throughout a range of $2^n$ different values, the several talkers of the first class being serially numbered, the other member of each such pair being a group of $m$ pulses representing only a portion of the amplitude of a sample of the speech of a talker of a second class throughout a narrower range of $2^m$ different values, where $m$ is an integer less than $n$, the several talkers of said second class being serially numbered, receiver station apparatus which comprises a storage device having a number N of discrete storage areas, means for writing the first member of each incoming pulse group pair into one of said several areas in numerical correspondence with the talker whose amplitude sample is represented by said member, means for writing the second member of each incoming pulse group pair into one of said several areas in numerical correspondence with the talker whose amplitude sample is represented by said last-named member, means for recovering information stored in the several areas of said device in numerical sequence, decoding means for converting each recovered pulse group into a speech sample, and means for distributing said last-named speech samples among said outgoing lines in numerical order.

7. An elastic time division multiplex transmitter comprising means providing a plurality of signal input terminals, means for recurrently deriving samples of signals appearing on each of said input terminals, means for detecting the energy level of each of said samples, means for deriving control signals representative of the energy level of each of said samples, means for encoding each of said samples and the corresponding one of said control signals to form a coded pair, a storage device, means for registering each of said coded pairs in said storage device, means for scanning said coded pairs, means controlled by said control signal codes, for interrupting said scanning means at each of said coded pairs including a control signal code of a first kind, means for transmitting a first finite portion of the sample code corresponding to each of said control signal codes of said first kind, means controlled by said control signal codes, for interrupting said scanning means at each of said coded pairs including a control signal code of a second kind, and means for transmitting a second substantially different finite portion of the sample code corresponding to each of said control signal codes of said second kind.

8. In an elastic time division multiplex transmission system, a plurality of signal channels, means for recurrently sampling each of said signal channels, means for detecting the energy level of each of said samples, storage means, means for registering each of said samples and the corresponding energy level of each of said samples in said storage means, means for systematically searching said storage means, means controlled by said energy levels, for interrupting said searching means at each of said samples having an energy level exceeding a first predetermined value, means for reading from said storage means said samples having energy levels exceeding said first predetermined value, means, controlled by said energy levels, for interrupting said searching means at each of said samples having an energy level exceeding a second predetermined value less than said first predetermined value, and means for reading from said storage means significant portions of said samples having energy levels exceeding said second predetermined value and less than said first predetermined value.

9. In a time division multiplex system, a plurality of signal sources, means for recurrently sampling each of said signal sources in regular succession, means for classifying each of said samples in one of a number of discrete energy levels, storage means, means for representing each of said samples in said storage means, means for systematically scanning the contents of said storage means, means controlled by said classifications, for accurately reading samples of a first energy level classification from said storage means, means, controlled by said classifications, for less accurately reading samples of a second energy level classification from said storage means and means, controlled by said classifications, for skipping samples of a third energy level classification.

10. In combination, a plurality of signal lines, means for deriving samples from said signal lines in regular succession, means for determining the energy level classification of each derived sample, means for encoding each of said samples and the corresponding energy level classification, means for transmitting the entire sample code corresponding to a first one of said energy level classifications in first portions of successive time intervals, means for transmitting only significant portions of the sample code corresponding to a second one of said energy level classifications in second portions of said successive time intervals, and means for transmitting energy level classification codes in third portions of said successive time intervals.

11. The combination according to claim 10 wherein said encoding means includes means for deriving sample codes comprising seven-digit binary permutation code groups, said significant portions comprising two digits of said seven-digit code groups.

12. The combination according to claim 10 wherein said encoding means includes means for deriving energy level classification codes comprising two-digit binary permutation code groups, the first digit of each of said two-digit code groups being transmitted in said third portion of one of said successive time intervals and the second digit of said two-digit code group being transmitted in said third portion of another one of said successive time intervals.

References Cited in the file of this patent
UNITED STATES PATENTS

| | | |
|---|---|---|
| 2,541,392 | Melhose | Feb. 13, 1951 |
| 2,744,960 | Greefkes et al. | May 8, 1956 |
| 2,807,783 | Vasseur | Sept. 24, 1957 |
| 2,832,827 | Metzger | Apr. 29, 1958 |
| 2,887,676 | Hamilton | May 19, 1959 |